(12) United States Patent
Basu et al.

(10) Patent No.: US 11,990,609 B2
(45) Date of Patent: May 21, 2024

(54) SOLUTION-DEPOSITED ELECTRODE COATINGS FOR THERMAL RUNAWAY MITIGATION IN RECHARGEABLE BATTERIES

(71) Applicant: Coreshell Technologies, Inc., Berkeley, CA (US)

(72) Inventors: Sourav Roger Basu, Berkeley, CA (US); Jonathan Tan, Berkeley, CA (US)

(73) Assignee: CORESHELL TECHNOLOGIES, INCORPORATED, San Leandro, CA (US)

(*) Notice: Subject to any disclaimer, the term of this patent is extended or adjusted under 35 U.S.C. 154(b) by 285 days.

(21) Appl. No.: 17/098,205

(22) Filed: Nov. 13, 2020

(65) Prior Publication Data
US 2021/0242454 A1 Aug. 5, 2021

Related U.S. Application Data

(63) Continuation-in-part of application No. 16/244,024, filed on Jan. 9, 2019, now Pat. No. 10,985,360, which
(Continued)

(51) Int. Cl.
*H01M 4/36* (2006.01)
*H01M 4/38* (2006.01)
(Continued)

(52) U.S. Cl.
CPC .......... *H01M 4/366* (2013.01); *H01M 4/382* (2013.01); *H01M 4/583* (2013.01); *H01M 4/62* (2013.01);
(Continued)

(58) Field of Classification Search
None
See application file for complete search history.

(56) References Cited

U.S. PATENT DOCUMENTS 4,130,446 A 12/1978 Murakami et al.
5,516,704 A 5/1996 Yoshida
(Continued)

FOREIGN PATENT DOCUMENTS

CN 111095627 5/2020
EP 3642896 4/2020
(Continued)

OTHER PUBLICATIONS

Emerging Application of Atomic Layer Deposition for Lithium-Ion Battery Studies in Advanced Materials, 2012, 24, 3589-3615 to Meng et al. (Year: 2012).*
(Continued)

*Primary Examiner* — Wyatt P McConnell
(74) *Attorney, Agent, or Firm* — SCHWEGMAN LUNDBERG & WOESSNER, P.A.

(57) ABSTRACT

Provided herein are battery cells comprising artificial solid-electrolyte interphase (SEI) layers used as protective coatings on electrodes. The SEI layers are produced by liquid-phase deposition (LDP). The battery cell may comprise an anode, a cathode, an electrolyte disposed between the anode and the cathode, a polymer separator disposed between the anode and the cathode, and a casing containing the anode, the cathode, the electrolyte, and the polymer separator, wherein at least one or the anode or cathode comprises an SEI layer produced by an LDP method.

25 Claims, 8 Drawing Sheets

Related U.S. Application Data is a continuation of application No. PCT/US2018/038612, filed on Jun. 20, 2018.

(60) Provisional application No. 62/934,522, filed on Nov. 13, 2019, provisional application No. 62/522,470, filed on Jun. 20, 2017.

(51) Int. Cl.

| | |
|---|---|
| *H01M 4/583* | (2010.01) |
| *H01M 4/62* | (2006.01) |
| *H01M 10/0525* | (2010.01) |
| *H01M 10/44* | (2006.01) |
| *H01M 4/02* | (2006.01) |
| *H01M 4/04* | (2006.01) |

(52) U.S. Cl.
CPC ....... *H01M 10/0525* (2013.01); *H01M 10/44* (2013.01); *H01M 2004/021* (2013.01); *H01M 2004/027* (2013.01); *H01M 4/0402* (2013.01); *Y02E 60/10* (2013.01)

(56) References Cited

U.S. PATENT DOCUMENTS

| | | | |
|---|---|---|---|
| 5,863,603 | A | 1/1999 | Sandhu et al. |
| 7,521,097 | B2 | 4/2009 | Horne et al. |
| 8,192,789 | B2 | 6/2012 | Albano et al. |
| 10,033,041 | B2 | 7/2018 | Perng et al. |
| 10,290,864 | B2 | 5/2019 | Burshtain et al. |
| 10,985,360 | B2 | 4/2021 | Basu et al. |
| 11,139,460 | B2 | 10/2021 | Basu et al. |
| 2005/0233156 | A1 | 10/2005 | Senzaki et al. |
| 2005/0287440 | A1 | 12/2005 | Chang et al. |
| 2006/0263687 | A1 | 11/2006 | Leitner et al. |
| 2008/0145755 | A1 | 6/2008 | Iacovangelo et al. |
| 2009/0246908 | A1 | 10/2009 | Basol et al. |
| 2009/0297696 | A1 | 12/2009 | Pore et al. |
| 2010/0193365 | A1 | 8/2010 | Lopatin et al. |
| 2010/0330425 | A1 | 12/2010 | Lopatin et al. |
| 2011/0159365 | A1 | 6/2011 | Loveness et al. |
| 2011/0159377 | A1 | 6/2011 | Lee et al. |
| 2011/0311867 | A1 | 12/2011 | Wakizaka et al. |
| 2012/0034767 | A1 | 2/2012 | Xiao et al. |
| 2012/0295038 | A1 | 11/2012 | Ma et al. |
| 2013/0248773 | A1 | 9/2013 | Chang et al. |
| 2013/0285597 | A1 | 10/2013 | Goldstein |
| 2013/0330472 | A1 | 12/2013 | Honda et al. |
| 2014/0125292 | A1 | 5/2014 | Best et al. |
| 2014/0234715 | A1 | 8/2014 | Fasching et al. |
| 2015/0148557 | A1 | 5/2015 | Lee et al. |
| 2015/0162602 | A1 | 6/2015 | Dadheech et al. |
| 2015/0364791 | A1 | 12/2015 | Vu et al. |
| 2016/0020449 | A1 | 1/2016 | Hamers et al. |
| 2016/0090652 | A1 | 3/2016 | Clark |
| 2016/0126582 | A1 | 5/2016 | Xiao et al. |
| 2016/0254572 | A1 | 9/2016 | Yu et al. |
| 2016/0351973 | A1 | 12/2016 | Albano et al. |
| 2017/0047575 | A1 | 2/2017 | Tsuji et al. |
| 2017/0104204 | A1 | 4/2017 | Zhamu et al. |
| 2017/0170477 | A1 | 6/2017 | Sakshaug et al. |
| 2017/0207451 | A1 | 7/2017 | Burshtain et al. |
| 2017/0331156 | A1 | 11/2017 | Visco et al. |
| 2017/0352883 | A1 | 12/2017 | Cho et al. |
| 2018/0375089 | A1 | 12/2018 | Gonser et al. |
| 2019/0044151 | A1 | 2/2019 | Elam et al. |
| 2019/0393478 | A1 | 12/2019 | Basu et al. |
| 2020/0161635 | A1 | 5/2020 | Liu et al. |
| 2021/0242443 | A1 | 8/2021 | Basu et al. |
| 2022/0045307 | A1 | 2/2022 | Basu et al. |
| 2022/0328812 | A1 | 10/2022 | Basu et al. |

FOREIGN PATENT DOCUMENTS

| | | |
|---|---|---|
| JP | H1079246 | 3/1998 |
| JP | 2012516941 | 7/2012 |
| JP | 2016521906 | 7/2016 |
| JP | 2020524890 A | 8/2020 |
| KR | 20200020713 | 2/2020 |
| WO | WO-2010090956 A2 | 8/2010 |
| WO | 2017093460 | 6/2017 |
| WO | 2018237083 | 12/2018 |
| WO | 2021096786 | 5/2021 |

OTHER PUBLICATIONS

Atomic Layer Deposition of TiO2 on negative electrode of lithium ion batteries in Journal of Power Sources, 2013, 244, at pp. 410-416 to Lee et al. (Year: 2013).*

"International Application Serial No. PCT US2020 019717, International Search Report dated Jul. 22, 2020", 4 pgs.

"International Application Serial No. PCT US2020 019717, Written Opinion dated Jul. 22, 2020", 11 pgs.

"International Application Serial No. PCT US2020 021995, International Search Report dated May 15, 2020", 3 pgs.

"International Application Serial No. PCT US2020 021995, Written Opinion dated May 15, 2020", 11 pgs.

"U.S. Appl. No. 16/244,024, Notice of Allowance dated Mar. 10, 2021", 9 pgs.

"International Application Serial No. PCT US2018 038612, International Preliminary Report on Patentability dated Jan. 2, 2020", 12 pgs.

"International Application Serial No. PCT US2018 038612, International Search Report dated Nov. 5, 2018", 4 pgs.

"International Application Serial No. PCT US2018 038612, Written Opinion dated Nov. 5, 2018", 10 pgs.

"U.S. Appl. No. 16/244,024, Non Final Office Action dated Mar. 15, 2019", 11 pgs.

"U.S. Appl. No. 16/244,024, Non Final Office Action dated Dec. 17, 2019", 12 pgs.

"U.S. Appl. No. 16/244,024, Non Final Office Action dated Dec. 1, 2020", 15 pgs.

"U.S. Appl. No. 16/244,024, Response filed Jun. 15, 2019 to Non Final Office Action dated Mar. 15, 2019", 14 pgs.

"U.S. Appl. No. 16/244,024, Response filed Feb. 10, 2020 to Non Final Office Action dated Dec. 17, 2019", 13 pgs.

"U.S. Appl. No. 16/244,024, Response filed Feb. 13, 2021 to Non Final Office Action dated Dec. 1, 2020", 13 pgs.

"U.S. Appl. No. 16/244,024, Final Office Action dated Jul. 16, 2019", 13 pgs.

"U.S. Appl. No. 16/244,024, Final Office Action dated Apr. 7, 2020", 13 pgs.

"U.S. Appl. No. 16/244,024, Response filed Oct. 16, 2019 to Final Office Action dated Jul. 16, 2019", 13 pgs.

"U.S. Appl. No. 16/244,024, Response filed May 15, 2020 to Final Office Action dated Apr. 7, 2020", 13 pgs.

"U.S. Appl. No. 16/244,024, Examiner Interview Summary dated May 22, 2019", 3 pgs.

"U.S. Appl. No. 16/244,024, Examiner Interview Summary dated May 5, 2020", 3 pgs.

"U.S. Appl. No. 16/244,024, Examiner Interview Summary dated Jan. 27, 2021", 2 pgs.

"U.S. Appl. No. 16/244,024, Advisory Action dated Jun. 2, 2020", 3 pgs.

"U.S. Appl. No. 16/244,024, Response filed Jun. 7, 2020 to Advisory Action dated Jun. 2, 2020", 14 pgs.

"International Application Serial No. PCT US2020 059590, International Search Report dated Feb. 4, 2021", 3 pgs.

"International Application Serial No. PCT US2020 059590, Written Opinion dated Feb. 4, 2021", 8 pgs.

"European Application Serial No. 18820797.1, Extended European Search Report dated Feb. 25, 2021", 9 pgs.

"U.S. Appl. No. 17/232,945, Preliminary Amendment filed Apr. 30, 2021", 3 pgs.

(56) References Cited

OTHER PUBLICATIONS

"U.S. Appl. No. 17/232,945, Non Final Office Action dated Jun. 11, 2021", 6 pages.

"U.S. Appl. No. 17/232,945, Response filed Jun. 22, 2021 to Non Final Office Action dated Jun. 11, 2021", 9 pages.

"U.S. Appl. No. 17/232,945, Notice of Allowance dated Aug. 20, 2021", 8 pgs.

"U.S. Appl. No. 17/232,945, Notice of Allowability dated Aug. 27, 2021", 2 pgs.

Ban, Chunmei, "Molecular Layer Deposition for Surface Modification of Lithium-Ion Battery Electrodes", Adv. Mater. Interfaces 2016, 1600762, (2016), 1-12.

U.S. Appl. No. 16/244,024, U.S. Pat. No. 10,985,360, filed Jan. 9, 2019, Methods, Systems, and Compositions for the Liquid-Phase Deposition of Thin Films Onto the Surface of Battery Electrodes.

U.S. Appl. No. 17/232,945, U.S. Pat. No. 11,139,460, filed Apr. 16, 2021, Methods for the Liquid-Phase Deposition of Thin Films Onto the Surface of Battery Electrodes (as amended).

U.S. Appl. No. 17/204,677, filed Mar. 17, 2021, Methods, Systems, and Compositions for the Liquid-Phase Deposition of Thin Films Onto the Surface of Battery Electrodes.

U.S. Appl. No. 17/410,797, filed Aug. 24, 2021, Methods, Systems, and Compositions for the Liquid-Phase Deposition of Thin Films Onto the Surface of Battery Electrodes.

"Korean Application Serial No. 10-2019-7037281, Response Filed Dec. 29, 2021 to Notice of Preliminary Rejection dated Oct. 29, 2021", with English claims, 25 pages.

"Japanese Application Serial No. 2019-571472, Response Filed Mar. 1, 2022 to Notification of Reasons for Refusal dated Oct. 26, 2021", with English claims, 14 pages.

"Japanese Application Serial No. 2019-571472, Notification of Reasons for Refusal dated Oct. 26, 2021", with English translation, 7 pages.

"Korean Application Serial No. 10-2019-7037281, Notice of Preliminary Rejection dated Oct. 29, 2021", with English translation, 5 pages.

"U.S. Appl. No. 17/848,707, Non Final Office Action dated Jan. 5, 2023", 8 pgs.

"U.S. Appl. No. 17/848,707, Response filed Apr. 5, 2023 to Non Final Office Action dated Jan. 5, 2023", 10 pgs.

"International Application Serial No. PCT/US2020/059590, International Preliminary Report on Patentability dated May 27, 2022", 10 pgs.

"Japanese Application Serial No. 2019-571472, Examiners Decision of Final Refusal dated May 10, 2022", w/ English translation, 4 pgs.

"Japanese Application Serial No. 2019-571472, Response Filed Sep. 6, 2022 to Examiners Decision of Final Refusal dated May 10, 2022", 15 pgs.

"Korean Application Serial No. 10-2019-7037281, Notice of Preliminary Rejection dated May 31, 2022", W/English Translation, 13 pgs.

"Korean Application Serial No. 10-2019-7037281, Response Filed Aug. 31, 2022 to Notice of Preliminary Rejection dated May 31, 2022", W/ English Claims, 21 pgs.

"Chinese Application Serial No. 201880040441.0, Response Filed Jun. 2, 2023 to Office Action dated Jan. 20, 2023", with English claims, 28 pages.

"U.S. Appl. No. 17/410,797, Response filed Jul. 21, 2023 to Non Final Office Action dated Mar. 22, 2023", 14 pgs.

"U.S. Appl. No. 17/848,707, Non Final Office Action dated Jul. 28, 2023", 6 pgs.

"U.S. Appl. No. 17/848,707, Response filed Jul. 20, 2023 to Final Office Action dated Apr. 20, 2023", 10 pgs.

"U.S. Appl. No. 17/848,707, Final Office Action dated Apr. 20, 2023", 8 pages.

"U.S. Appl. No. 17/410,797, Notice of Allowance dated Oct. 25, 2023", 10 pgs.

"U.S. Appl. No. 17/848,707, Examiner Interview Summary dated Nov. 9, 2023", 2 pgs.

"U.S. Appl. No. 17/848,707, Final Office Action dated Nov. 21, 2023", 7 pgs.

"U.S. Appl. No. 17/848,707, Response filed Oct. 30, 2023 to Non Final Office Action dated Jul. 28, 2023", 14 pgs.

"Chinese Application Serial No. 201880040441.0, Office Action dated Nov. 15, 2023", w/ English Translation, 69 pgs.

"U.S. Appl. No. 17/410,797, 312 Amendment filed Jan. 25, 2024", 9 pgs.

"U.S. Appl. No. 17/410,797, PTO Response to Rule 312 Communication mailed Feb. 2, 2024", 2 pgs.

"U.S. Appl. No. 17/410,797, PTO Response to Rule 312 Communication mailed Feb. 16, 2024", 2 pgs.

"U.S. Appl. No. 17/410,797, Supplemental Notice of Allowability mailed Feb. 22, 2024", 2 pgs.

"U.S. Appl. No. 17/410,797, Supplemental Notice of Allowability mailed Feb. 28, 2024", 2 pgs.

"U.S. Appl. No. 17/848,707, Final Office Action mailed Mar. 29, 2024", 8 pgs.

"U.S. Appl. No. 17/848,707, Response filed Mar. 21, 2024 to Final Office Action mailed Nov. 21, 2023", 10 pgs.

"U.S. Appl. No. 18/594,876, Preliminary Amendment filed Mar. 7, 2024", 3 pgs.

"Chinese Application Serial No. 201880040441.0, Office Action mailed Feb. 7, 2024", w/ English Translation, 76 pgs.

"Chinese Application Serial No. 201880040441.0, Response Filed Jan. 30, 2024 to Office Action mailed Nov. 15, 2023", w/ English claims, 26 pgs.

* cited by examiner 100 nm 200 nm

SOLUTION-DEPOSITED ELECTRODE COATINGS FOR THERMAL RUNAWAY MITIGATION IN RECHARGEABLE BATTERIES

CROSS-REFERENCE TO RELATED APPLICATIONS

This application claims the benefit of U.S. Provisional Application No. 62/934,522, filed on Nov. 13, 2019, and is a continuation-in-part application of U.S. application Ser. No. 16/244,024, filed on Jan. 9, 2019, which is a continuation application of International Patent Application No. PCT/US2018/038612, filed on Jun. 20, 2018, which claims the benefit of U.S. Provisional Application No. 62/522,470, filed on Jun. 20, 2017, each of which is entirely incorporated by reference herein for all purposes.

FIELD

Embodiments of the present disclosure generally relate to methods, systems and materials for coating protective thin films onto the surface of battery electrodes resulting in batteries that demonstrate improved safety and thermal stability.

BACKGROUND

Rechargeable batteries often undergo catastrophic failure due to uncontrolled self-heating from a series of internal chemical reactions—typically referred to as "thermal runaway". For example, in the case of Lithium-Ion batteries, a series of self-catalyzing exothermic reactions occur in the range of 60-300° C. that eventually lead to mechanical cell failure, short-circuiting of anode to cathode and combustion of flammable electrolytes.

However, to initiate these reactions, a Lithium-Ion battery must first be heated to a temperature>60° C., and its propensity for fulfilling the full chain of reactions comprising thermal runaway can also depend upon its state of charge. The temperature at which thermal runaway begins is typically observed by performing calorimetry on a Lithium-Ion battery within an adiabatic chamber. As the temperature of the battery is increased, a net positive measurement of heat indicates an exothermic process within the cell. Monotonically increasing heat generation observed from the cell without any further heat added into the adiabatic chamber indicates thermal runaway.

One example of a scenario where thermal runaway is likely to occur is when the anode and cathode of a highly-charged Lithium-Ion battery electrically contact each other due to a mechanical failure of the polymer separator. Under this circumstance, a large current passes through the point of contact as the cell discharges. This current results in joule heating of the surrounding material, raising the internal temperature of the battery above 60° C. (and locally, potentially much higher), thereby initiating the chain of thermal runaway reactions ultimately resulting in catastrophic failure such as conflagration.

However, it has also been shown that an electrical short-circuit is not necessary to initiate thermal runaway. Lithium-Ion batteries have also been observed to undergo thermal runaway under conditions where the ambient temperature is simply raised to 60° C. or greater. Under these conditions, even without an electrical short-circuit, Lithium-Ion batteries can undergo thermal runaway due to a sufficiently high enough temperature for initiating the first exothermic reaction.

Much recent literature has been devoted to understanding the key reactions leading to thermal runaway in Lithium-Ion batteries, and has determined that the decomposition of an electrode surface degradation product, commonly termed "SEI" or solid-electrolyte-interphase, is the first exothermic reaction to occur in the 60-90° C. temperature window. SEI typically forms at the beginning of a Lithium-Ion battery's cycle life, and is the result of the fact that typical Lithium-Ion battery electrolytes are electrochemically unstable on both anode and cathode surfaces at or near a full state-of-charge. Under these conditions, electrolyte reduction and oxidation products (on anode and cathode, respectively), will combine with available Lithium to precipitate a solid layer on all electrochemically active surfaces. This layer then acts as a kinetic barrier to further electrolyte decomposition.

For example, for state-of-the-art Lithium-Ion batteries fabricated with graphite anodes, $LiNi_xMn_yCo_zO_2$ cathodes and electrolyte comprising $LiPF_6$ salt and ethylene carbonate/ethyl methyl carbonate solvent blend, the majority of the SEI formed on the anode is typically composed of LiF, $Li_2CO_3$, LiEDC (($CH_2OCO_2Li)_2$) and Lithium Alkyl Carbonates ($ROCO_2Li$, where R can comprise a variety of alkyl groups). Literature has indicated that at temperatures as low as 55° C., both LiEDC and Lithium Alkyl Carbonates can react with remaining electrolyte to yield a variety of reaction products, including $CO_2$ gas, LiF, HF, ethers, phosphates and fluorophosphates. Many of these reactions are also exothermic. In addition, decomposition of existing SEI can result in the generation of new SEI, which is also known to be exothermic. If the heat generated from the combination of such reactions is able to increase the local cell temperature to 100° C. or higher, a high likelihood exists that the mechanical integrity of the polymer anode-cathode separator will be compromised. Under such conditions, an electrical short between anode and cathode can also occur, leading to further temperature increase and further deleterious reactions.

For many Lithium-ion cathode materials, temperatures in excess of ~160° C. can cause rapid release of oxygen from the host lattice. For example, for the common commercial cathode material $LiCoO_2$, temperatures in excess of 180° C. cause oxygen loss. Oxygen, combined with heat and flammable electrolyte provide the necessary conditions for combustion, leading to catastrophic failure.

As a result, any technology that is capable of preventing the decomposition of SEI or of the electrode materials themselves can greatly improve the resistance of Lithium-ion batteries to thermal runaway.

Recent research has attempted to improve the thermal stability of Lithium-Ion batteries through the application of thin-film coatings deposited on anode and cathode surfaces by Atomic Layer Deposition (ALD). Such coatings are often termed "artificial SEI". Coatings applied via ALD on anodes have yielded an increase in the onset temperature of self-heating characteristics indicative of thermal runaway, and have also demonstrated reduced degradation of cathode materials.

Unfortunately, the introduction of a "roll-to-roll" (R2R) ALD process into a traditional, high-volume Lithium-Ion manufacturing line is untenable primarily due to the fact that ALD is a slow, capital-intensive, vacuum process.

Therefore, there is a need in the industry to apply thin-film coatings to Lithium-Ion battery electrodes in order to yield batteries that have improved thermal stability, while doing so in a manner that is also scalable to R2R high-volume manufacturing.

High quality, conformal thin films of oxides and chalcogenides have been deposited for decades by techniques other than ALD, such as chemical bath deposition (CBD), successive-ionic layer adsorption and reaction (SILAR) and layer-by-layer sol-gel. In the CBD technique, (typically) aqueous solutions of complexed metal precursors are mixed with chalcogenide or oxide ion sources. Such techniques have also been widely implemented in a continuous, R2R format. Temperatures for these processes are usually modest, well below decomposition temperatures for battery electrode materials, binders or separators. CBD is best known for being used for depositing high quality CdS or ZnS as the n-type junction partner on CdTe or CIGS thin film solar cells. This technique has been used for years to set world record efficiencies for these types of solar cells. They have yielded high open-circuit voltages, high diode ideality and high shunt resistance, indicating excellent film quality and conformality. CBD processes have also been commercialized into high-volume thin film solar cell production lines.

A useful variation of the CBD technique is SILAR. In this instance, substrates are alternately exposed to cationic and anionic reactant solutions, with rinse steps in between. While this technique results in slower film growth, a benefit of the technique is the elimination of homogenous nucleation (precipitation) from intermixing of the two reactants, which dramatically improves materials utilization. Considering the fact that the tunneling limit of a good dielectric is on the order of 1-2 nm, SILAR techniques are feasible for deposition of passivation layers on battery electrode surfaces. Thickness control in SILAR processes is also better than in CBD processes; thickness control of a passivation layer on battery electrodes, for instance, is critical to prevent unwanted barriers to lithium diffusion while maintaining an electron tunneling barrier.

Solution-based techniques also exist that demonstrate layer by layer sol-gel coating using the same kinds of metal organics used in vapor phase ALD. For instance, an $Al_2O_3$ monolayer can be grown by immersion of a substrate in a solution of an appropriate aluminum alkoxide. The adsorption of the metalorganic precursor, followed by an oxidizing step such as hydrolysis, can yield one monolayer of oxide. These steps are repeated with rinse steps in between to yield monolayer-by-monolayer coatings. The metal alkoxide precursors are typically soluble to very high molarities in standard organic solvents like 2-propanol. In recent years, high quality $Al_2O_3$, $SiO_2$ and $ZrO_2$ recombination blocking layers were all grown on $TiO_2$ dye-sensitized solar cells using this technique.

U.S. PGPUB 2016/0090652 presents a liquid phase ALD method akin to that described above, wherein discrete wafer substrates are consecutively exposed to a solution of metalorganic precursor, a rinse solvent to remove excess metalorganic, an oxidizing solution and another rinse. These four steps are repeated to yield any desired thickness of film. The wafer is attached to a spin-coating apparatus; immediately after each step the wafer is spun to remove excess fluid. While this technique may work well for substrates similar to wafers, the process cannot be used to coat continuous substrates such as rolls of foil.

Accordingly, a need exists for an alternative deposition method to ALD and other conventional methods that is faster, more efficient, safer, and more cost-effective for yielding conformal coatings on the surface of battery electrodes in order to mitigate thermal runaway. To-date, solution deposition equipment that deposits conformally grown thin films on rolls of battery electrodes at commercial scale has not yet been demonstrated. Examples of key difficulties that have yet to be solved include homogeneous nucleation during film growth, cross-contamination of precursor solutions and uniformity of film thickness at all locations in the film.

SUMMARY

In certain aspects, the present disclosure provides a battery cell, comprising an anode; a cathode; an electrolyte disposed between the anode and the cathode; a polymer separator disposed between the anode and the cathode; and a casing containing the anode, the cathode, the electrolyte, and the polymer separator, wherein the casing allows for electrical contact to the anode and the cathode, and wherein at least one of the anode or cathode comprises an artificial solid-phase electrolyte interphase (SEI) layer produced by a liquid-phase deposition method.

In some embodiments, the anode possesses the artificial SEI layer. In some embodiments, the cathode possesses the artificial SEI layer. In some embodiments, both the anode and the cathode possess artificial SEI layers. In some embodiments, the battery cell is rechargeable.

In some embodiments, the artificial SEI is produced by a liquid-phase deposition method, the method comprising: providing a battery electrode, such as an anode or cathode, onto a conveyance apparatus; transferring, by the conveyance apparatus, the electrode to a first reaction chamber containing a first liquid solution comprising at least a first reagent; exposing, by the conveyance apparatus, the electrode to the first liquid solution in the first reaction chamber to yield a partially coated layer of the artificial SEI with the at least first reagent chemically bonded onto the surface of the battery electrode; rinsing, in the first reaction chamber, the layer with a first rinsing solution comprising a first solvent to remove unreacted first reagent; transferring, by the conveyance apparatus, the electrode to a second reaction chamber containing a second liquid solution comprising at least a second reagent; exposing, by the conveyance apparatus, the electrode to the second liquid solution in the second reaction chamber, wherein the at least second reagent reacts with the at least first reagent chemically bonded onto the surface of the electrode to produce the artificial SEI comprising a monolayer on the surface of the electrode, the monolayer comprising a compound generated from the reaction of the at least second reagent and the first reagent; and rinsing, in the second reaction chamber, the coating with a second rinsing solution comprising a second solvent to remove unreacted second reagent. In some embodiments, the aforementioned steps are repeated to yield consecutive growth of multiple stacked monolayers, thereby yielding a thin film coating having an overall thickness between 0.5 nanometers (nm) and 100 micrometers (μm).

In some embodiments, anode and/or cathode has a thickness of 100 nm to 1,000 μm prior to coating of the artificial SEI. In some embodiments, the anode and/or cathode in (a) has pores ranging in size of 0.1 nm to 100 μm. In some embodiments, anode and/or cathode in (a) has a film porosity of 1-99%.

In some embodiments, the artificial SEI is engineered to withstand exposures to temperatures up to 100° C., 200° C., or 300° C. without decomposing exothermically. In some embodiments, the artificial SEI is engineered to withstand exposures to temperatures up to 100° C., 200° C., or 300° C.

without reacting exothermically with any physically adjacent electrolyte, separator or other battery component.

In some embodiments, the anode is composed of graphite, Si, Sn, a Si-graphite composite, a Sn-graphite composite, or lithium metal. In some embodiments, the cathode is composed of $LiNi_xMn_yCo_zO_2$, $LiNi_xCo_yAl_zO_2$, $LiMn_xNi_yO_z$, $LiMnO_2$, $LiFePO_4$, $LiMnPO_4$, $LiNiPO_4$, $LiCoPO_4$, $LiV_2O_5$, sulfur or $LiCoO_2$ where x, y and z are stoichiometric coefficients.

In some embodiments, the conveyance apparatus used in the liquid-phase deposition method comprises a series of rollers for guiding the battery anode or cathode and partially coated battery anode or cathode to the first and second reaction chambers, respectively. In some embodiments, the anode, cathode, partially coated anode, and/or partially coated cathode are exposed to the first and second liquid solutions by a process selected from the group consisting of submerging, spraying, slot die coating, and gravure roller coating. In some embodiments, the first and second liquid solutions used in the liquid-phase deposition method are non-ionic.

In some embodiments, the liquid-phase deposition method further comprises rinsing the partially coated battery anode or cathode with a first rinsing solution comprising a first solvent to produce a saturated first layer on the partially coated battery anode or cathode and a first residual solution comprising the first solvent and unreacted first reagent. In some embodiments, the liquid-phase deposition method further comprises passing the first residual solution to a first filtration step to separate unreacted first reagent from the first solvent. In some embodiments, the liquid-phase deposition method further comprises: rinsing the fully coated battery anode or cathode with a second rinsing solution comprising a second solvent to produce a saturated monolayer of thin film on the fully coated battery anode or cathode and a second residual solution comprising the second solvent and unreacted second reagent. In some embodiments, the liquid-phase deposition method further comprises passing the second residual rinsing solution to a second filtration step to separate the unreacted second reagent from the second solvent. In some embodiments, the liquid-phase deposition method further comprises recycling recovered unreacted first or second reagent back to the first or second liquid solutions, respectively; and recycling recovered first or second solvent back to the first or second rinsing solutions, respectively.

In some embodiments, the filtration steps of the liquid-phase deposition method are carried out using membrane separation, chemical precipitation, ion-exchange, electrochemical removal, physical adsorption, flow filtration chromatography, or a combination of these. In some embodiments, the first liquid solution of the liquid-phase deposition method comprises more than one reagent. In some embodiments, the second liquid solution comprises more than one reagent. In some embodiments, the first and second reagents are metalorganic precursors. In some embodiments, the first and second reagents are cationic or anionic. In some embodiments, the first and second liquid solutions further comprise an organic solvent, water, or a mixture of both.

In some embodiments, the compound generated by the liquid-phase deposition method is selected from one of the following groups: binary oxides of type $A_xO_y$, where A is an alkali metal, alkali-earth metal, transition metal, semimetal or metalloid and x and y are stoichiometric coefficients; ternary oxides of type $A_xB_yO_z$, where A and B are any combination of alkali metal, alkali-earth metal, transition metal, semimetal or metalloid and x, y and z are stoichiometric coefficients; quaternary oxides of type $A_wB_xC_yO_z$, where A, B and C are any combination of alkali metal, alkali-earth metal, transition metal, semimetal or metalloid and w, x, y and z are stoichiometric coefficients; binary halides of type $A_xB_y$, where A is an alkali metal, alkali-earth metal, transition metal, semimetal or metalloid, B is a halogen and x and y are stoichiometric coefficients; ternary halides of type $A_xB_yC_z$, where A and B are any combination of alkali metal, alkali-earth metal, transition metal, semimetal or metalloid, C is a halogen and x, y and z are stoichiometric coefficients; quaternary halides of type $A_wB_xC_yD_z$, where A, B and C are any combination of alkali metal, alkali-earth metal, transition metal, semimetal or metalloid, D is a halogen and w, x, y and z are stoichiometric coefficients; binary nitrides of type $A_xN_y$, where A is an alkali metal, alkali-earth metal, transition metal, semimetal or metalloid and x and y are stoichiometric coefficients; ternary nitrides of type $A_xB_yN_z$, where A and B are any combination of alkali metal, alkali-earth metal, transition metal, semimetal or metalloid and x, y and z are stoichiometric coefficients; quaternary nitrides of type $A_wB_xC_yN_z$, where A, B and C are any combination of alkali metal, alkali-earth metal, transition metal, semimetal or metalloid and w, x, y and z are stoichiometric coefficients; binary chalcogenides of type $A_xB_y$, where A is an alkali metal, alkali-earth metal, transition metal, semimetal or metalloid, B is a chalcogen and x and y are stoichiometric coefficients; ternary chalcogenides of type $A_xB_yC_z$, where A and B are any combination of alkali metal, alkali-earth metal, transition metal, semimetal or metalloid, C is a chalcogen and x, y and z are stoichiometric coefficients; quaternary chalcogenides of type $A_wB_xC_yD_z$, where A, B and C are any combination of alkali metal, alkali-earth metal, transition metal, semimetal or metalloid, D is a chalcogen and w, x, y and z are stoichiometric coefficients; binary carbides of type $A_xC_y$, where A is an alkali metal, alkali-earth metal, transition metal, semimetal or metalloid and x and y are stoichiometric coefficients; binary oxyhalides of type $A_xB_yO_z$, where A is an alkali metal, alkali-earth metal, transition metal, semimetal or metalloid, B is a halogen and x, y and z are stoichiometric coefficients; binary arsenides of type $A_xAs_y$, where A is an alkali metal, alkali-earth metal, transition metal, semimetal or metalloid and x and y are stoichiometric coefficients; ternary arsenides of type $A_xB_yAs_z$, where A and B are any combination of alkali metal, alkali-earth metal, transition metal, semimetal or metalloid and x, y and z are stoichiometric coefficients; quaternary arsenides of type $A_wB_xC_yAs_z$, where A, B and C are any combination of alkali metal, alkali-earth metal, transition metal, semimetal or metalloid and w, x, y and z are stoichiometric coefficients; binary phosphates of type $A_x(PO_4)_y$, where A is an alkali metal, alkali-earth metal, transition metal, semimetal or metalloid and x and y are stoichiometric coefficients; ternary phosphates of type $A_xB_y(PO_4)_z$, where A and B are any combination of alkali metal, alkali-earth metal, transition metal, semimetal or metalloid and x, y and z are stoichiometric coefficients; and quaternary phosphates of type $A_wB_xC_y(PO_4)_z$, where A, B and C are any combination of alkali metal, alkali-earth metal, transition metal, semimetal or metalloid and w, x, y and z are stoichiometric coefficients.

In some embodiments, the anode or cathode of the battery cell further comprises a substrate. In some embodiments, the substrate is in the form of a foil, sheet, or film.

In some embodiments, the monolayer produced by the liquid-phase deposition method is composed of at least one or more metalcones. In some embodiments, the metalcone(s) is generated by a reaction between a first reagent comprising a metalorganic and a second reagent comprising an organic molecule. In some embodiments, the first reagent is a metalorganic comprising an organic moiety and a metal comprising Al, Zn, Si, Ti, Zr, Hf, Mn, and/or V, and the second reagent is an organic molecule comprising ethylene glycol, glycerol, erythritol, xylitol, sorbitol, mannitol, butanediol, pentanediol, hydroquinone, hexanediol, lactic acid, triethanolamine, p-phenylenediamine, glycidol, caprolactone, fumaric acid, aminophenol, and/or diamino diphenyl ether.

In some embodiments, the monolayer produced by the liquid-phase deposition method is composed of one or more organic material(s). In some embodiments, the organic material(s) is a polymer comprising a polyamide, polyimide, polyurea, polyazomethine, a fluoroelastomer, or any combination of these.

In some embodiments, the battery cell undergoes self-heating at a temperature greater than that observed in a corresponding battery cell not possessing an artificial SEI on an anode and/or a cathode. In some embodiments, the battery cell evolves $CO_2$, $O_2$, $H_2$ or any other gas at a temperature greater than that observed in a corresponding battery cell not possessing artificial SEI on either anode or cathode.

In some embodiments, the anode and/or cathode comprise one or more of the following: graphite, Si, Sn, Ge, Al, P, Zn, Ga, As, Cd, In, Sb, Pb, Bi, SiO, $SnO_2$, Si, Sn, lithium metal, $LiNi_xMn_yCo_zO_2$, $LiNi_xCo_yAl_zO_2$, $LiMn_xNi_yO_z$, $LiMnO_2$, $LiFePO_4$, $LiMnPO_4$, $LiNiPO_4$, $LiCoPO_4$, $LiV_{2O5}$, sulfur or $LiCoO_2$ where x, y and z are stoichiometric coefficients.

In some embodiments, the electrolyte comprises a salt and a solvent. In some embodiments, the salt is $LiPF_6$, $LiClO_4$, LiTFSI or $LiNO_3$ In some embodiments, the solvent comprises one or more of the following: ethylene carbonate, ethyl methyl carbonate, dimethyl carbonate, fluorinated ethylene carbonate, propylene carbonate.

In certain aspects, the present disclosure provides a battery cell, comprising: an anode; a cathode; an electrolyte disposed between the anode and the cathode; a polymer separator disposed between the anode and the cathode; and a casing containing the anode, the cathode, the electrolyte, and the polymer separator, wherein the casing provides electrical contact to the anode and the cathode, wherein the anode, cathode, and/or both comprise an artificial SEI coating, and wherein the battery cell evolves $CO_2$, $O_2$, $H_2$ or any other gas at a temperature greater than that observed in a corresponding battery cell not possessing artificial SEI on either anode or cathode.

In certain aspects, the present disclosure provides a battery cell, comprising: an anode; a cathode; an electrolyte disposed between the anode and the cathode; a polymer separator disposed between the anode and the cathode; and a casing containing the anode, the cathode, the electrolyte, and the polymer separator, wherein the casing provides electrical contact to the anode and the cathode; wherein the anode, the cathode, and/or both comprise an artificial SEI coating, wherein the battery cell undergoes self-heating temperature greater than that observed in a corresponding battery cell not possessing an artificial SEI on either an anode or a cathode.

DETAILED DESCRIPTION

The present disclosure provides battery cells comprising artificial SEI layers as protective coatings on electrodes. These thin films are produced by the reaction of two or more reagents during a liquid-phase deposition method. The artificial SEI layer acts as a protective coating on electrode constituent particles while allowing the particles to maintain particle-to-particle electrical and physical contact, thereby maintaining battery power capability. Furthermore, the protective coatings reduce the propensity for batteries to undergo a sequential cascade of exothermic reactions commonly described as "thermal runaway".

To date, techniques for forming conformal coatings of thin films (<10 micrometer (μm) thickness) on substrates with a microstructure comprising a high degree of porosity, tortuosity and/or large number of high aspect ratio features (i.e., "non-planar" microstructure) are either ineffective ("line of sight" limitation of physical vapor deposition) or are costly and time-consuming (traditional Atomic Layer Deposition (ALD)). Accordingly, the present disclosure provides methods and systems for achieving a cost-effective means for forming uniform, conformal layers on non-planar microstructures. Specifically, the present disclosure focuses on forming uniform, conformal layers on the surface of non-planar battery electrodes.

Figure 8:
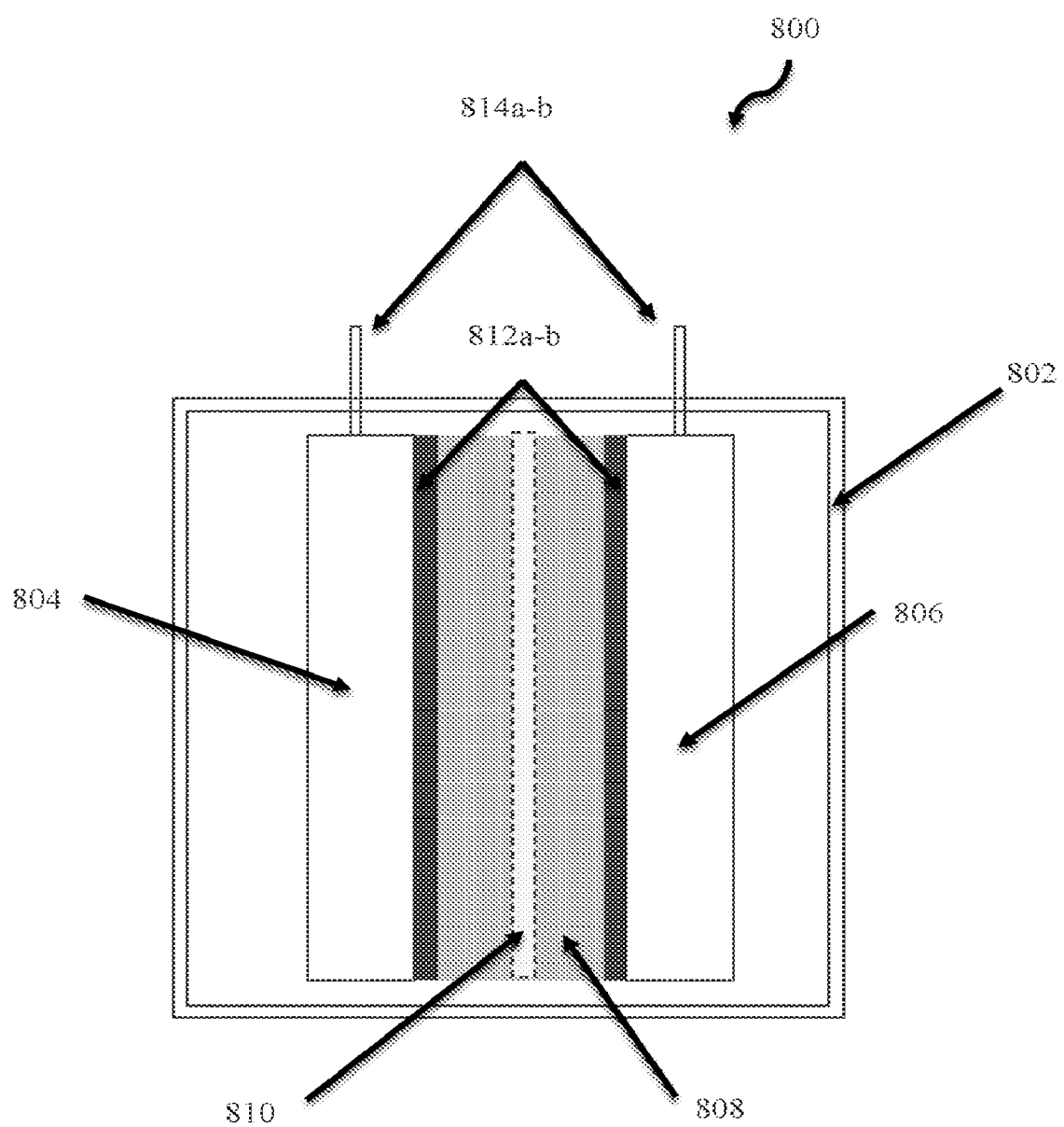
FIG. 8 is an illustration of a battery cell comprising electrodes coated with the artificial SEI layer in accordance with the present disclosure.

An example of an embodiment of a battery cell comprising an artificial SEI layer formed by a liquid-phase deposition method in accordance with the present disclosure is shown in FIG. 8. A battery cell, 800, comprises a casing, 802, that houses electrodes 804 (anode) and 806 (cathode). The electrodes each have an electrical contact 814*a-b* that extends out of casing 802. An electrolyte, 808, is located between the two electrodes and separated by separator 810. Artificial SEI layers 812*a-b* are coated on the surface of each electrode.

An electrode comprises a porous coating on top of a substrate, such as a foil or a sheet. The electrodes are fully-formed. Full-forming an electrode refers to a standard sequence of electrode forming processes, including but not limited to, casting of slurries of active and inactive material components onto a foil substrate to form an electrode, followed by drying of the electrode, followed by calendaring of the electrode. In some embodiments, full-forming of an electrode does not include calendaring. In some embodiments, the battery electrode comprises graphite, Si, Sn, a silicon-graphite composite, a Sn-graphite composite, or lithium metal. In some cases, the battery electrode comprises $LiNi_xMn_yCo_zO_2$, $LiNi_xCo_yAl_zO_2$, $LiMn_xNi_yO_z$, $LiMnO_2$, $LiFePO_4$, $LiMnPO_4$, $LiNiPO_4$, $LiCoPO_4$, $LiV_2O_5$, sulfur or $LiCoO_2$ where x, y and z are stoichiometric coefficients. In some embodiments, the anode and/or cathode comprise one or more of the following: graphite, Si, Sn, Ge, Al, P, Zn, Ga, As, Cd, In, Sb, Pb, Bi, SiO, $SnO_2$, Si, Sn, lithium metal.

In certain embodiments, the substrate may be a continuous substrate, typically in the form of a foil or sheet. A "continuous substrate" as used herein refers to a substrate that possesses an aspect ratio of at least 10:1 between its two largest dimensions, and is sufficiently flexible so as to be wound onto itself in the form of a roll. It may be made up of various materials, including but not limited to metal, such as copper, aluminum, or stainless steel, or an organic material, such as polyimide, polyethylene, polyether ether ketone (PEEK), or polyester, polyethylene napthalate (PEN).

The battery cell also comprises an electrolyte that is disposed between the electrodes. The electrolyte is typically composed of an organic solvent and a salt. In some embodiments, the solvent is composed of one or more of the following: ethylene carbonate, ethyl methyl carbonate, dimethyl carbonate, triglyme, tetraglyme, gamma-butyrlactone, ethyl acetate, fluorinated ethylene carbonate, propylene carbonate or any other organic chemical commonly known in the art as a suitable battery solvent. In some embodiments, the salt is composed of one or more of the following: $LiPF_6$, LiTFSI, LiFSI, $LiClO_4$, $LiNO_3$ or any other lithium salt commonly known in the art as a suitable battery salt.

A separator, such as a polymer separator, is typically positioned between the electrodes. Polymer separators are composed of single-layer or multilayer stacks of any combination of the following: polyethylene, polypropylene, polyvinylidene fluoride, polylactic acid, polyimide, polyamide, polyethylene oxide, or any other polymer known in the art as a suitable battery separator. In some embodiments, glass fiber is used as a separator in place of or in addition to a polymer separator. In some embodiments the polymer separator may also be coated with thin films of other polymers or oxides, including but not limited to: cellulose, polyethylene oxide, aramid, polymethyl methacrylate, polyamide, polyaryletherketone, polyvinylidene fluoride, polyimide, aluminum oxide or silicon oxide.

The battery cell further comprises a casing or housing that contains the electrodes, the separator, and the electrolyte. Battery casings are typically composed of stainless steel, with grade 304 or 316. In some embodiments, the battery casing may be composed of aluminum. For coin, cylindrical and prismatic cell formats, casings are typically constructed of metals including but not limited to 304 stainless steel, 316 stainless steel or aluminum. For pouch cell formats, casings are typically constructed of polymers including but not limited to polyethylene, polyimide and polyamide. In some embodiments, pouch cell casings are laminated with thin sheets of metals such as aluminum.

Figure 7:
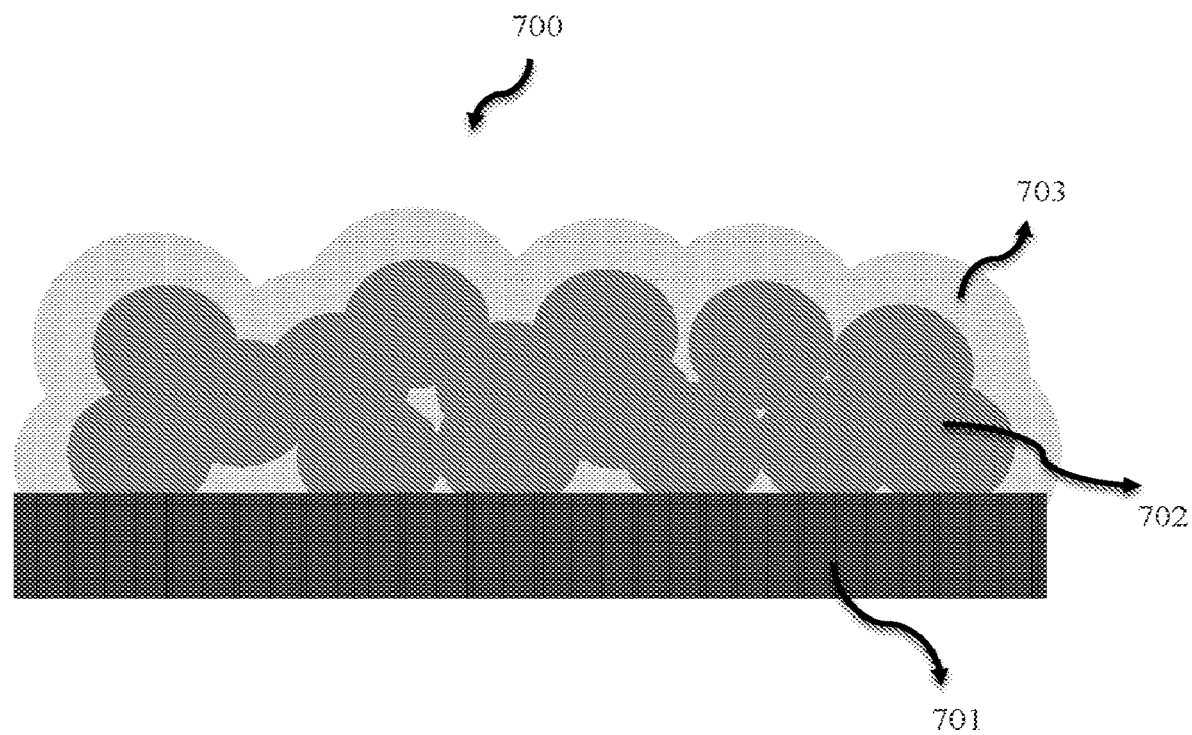
FIG. 7 is an illustration of a battery electrode coated with an artificial SEI in accordance with the present disclosure on top of a foil substrate.

An example of an embodiment of a coated battery electrode in accordance with the present disclosure is shown in FIG. 7. A coated battery electrode, 700, comprises electrode constituent particles (i.e., an active layer), 702, that are coated with an artificial SEI, 703, that is produced by a liquid-phase deposition method as described herein. The artificial SEI, 703, may be between 0.5 nm to 100 μm thick. The electrode constituent particles, 702, are situated on top of a foil substrate, 701.

In certain aspects, the present disclosure provides methods and systems for generating a an artificial SEI layer in batteries that is more resistant to dissolution than current SEIs, has sufficient adhesion to the material or component to be coated with adequate mechanical stability, is reasonably electrically resistive to prevent electrolyte breakdown while being conductive of ions (as in the case of batteries, for example lithium ions), and is substantially devoid of any particle-to-particle internal resistance. In addition, the artificial SEI performs any of the following in isolation or in conjunction: reduce heat evolved from exothermic reactions within a battery, reduce gas evolution from anodes and/or cathodes as the battery temperature is increased, reduce dissolution of active materials, and/or increase onset temperature of thermal runaway.

The methods described herein for generating the artificial SEI is a liquid-phase deposition process. The artificial SEIs are used to coat the surfaces of components of electrochemical devices such as batteries. In particular, for batteries, such as lithium ion batteries, applications that may benefit with the coatings described herein may include high-voltage cathodes, fast charging, silicon-containing anodes, cheaper electrolytes, and nanostructured electrodes. Thus, in some embodiments, the thin films may be coated onto an electrode of a battery, such as a cathode or anode.

Figure 1:
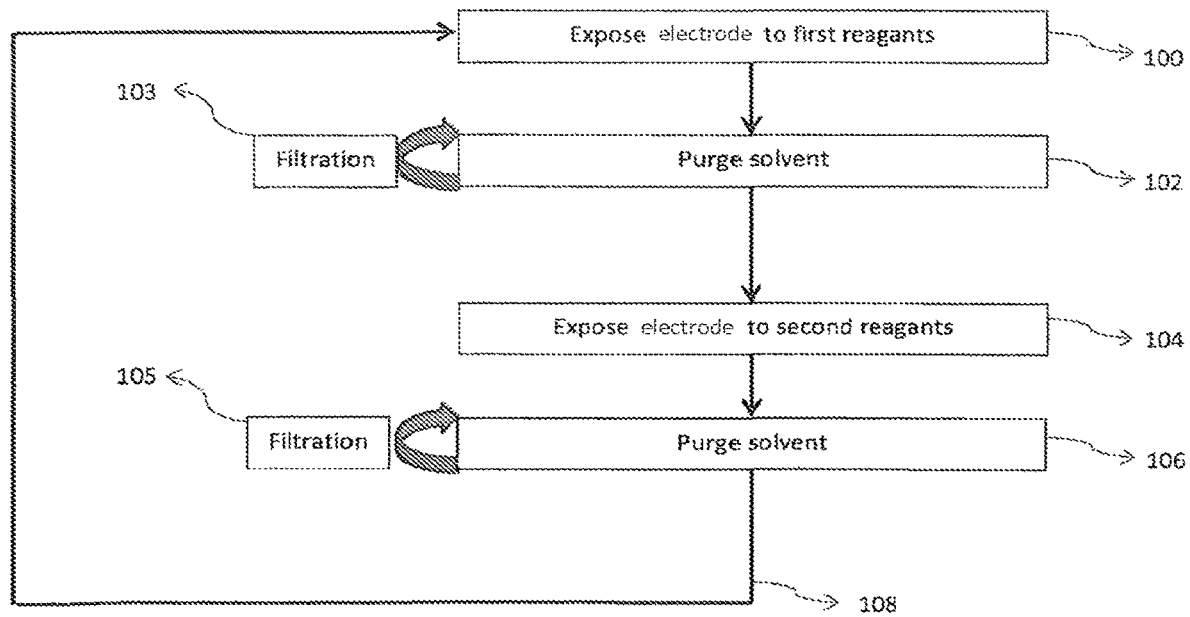
FIG. 1 is a general flow scheme for an embodiment of the method in accordance with the disclosure. The method includes rinsing/purge steps as well as filtration steps.

A simple flow scheme for an embodiment of the method in accordance with the disclosure is shown in FIG. 1. While the embodiment of FIG. 1 is related to a method for coating an artificial SEI onto the surface of a battery electrode, this description is only representative of a component to be deposited using the methods and systems provided herein and is not to be construed as being limited in any way.

Referring to FIG. 1, a battery electrode, for example, may be exposed, in 100, to a first liquid solution comprising a first reagent(s) in a first reaction chamber to produce a layer comprising an adsorbed first reagent(s) on the surface of the electrode.

The first liquid solution comprises at least a first reagent. The first reagent may be any compound that is able to react with the material of the electrode (i.e., the component to be coated) to form a self-limiting layer. In certain embodiments, the first reagent is a metalorganic compound. Examples of such metalorganics include, but are not limited to, aluminum tri-sec butoxide, titanium ethoxide, niobium ethoxide, trimethyl aluminum, and zirconium tert-butoxide. In another embodiment, the first reagent comprises an aqueous solution comprising an ionic compound. Examples include, but are not limited to, zinc acetate, cadmium chloride, zinc chloride, zirconium chloride, and zinc sulfate. In some embodiments, the first solution may vary in pH. In some embodiments, the first liquid solution may be a solution including ionic compounds of both cationic and anionic precursors that react to form a solid film; in this case the film growth is limited by the kinetics of the film-forming reaction. In some embodiments, the first liquid solution may be a solution including both metalorganic and oxidizing precursors that react to form a solid film; in this case the film growth is limited by the kinetics of the film-forming reaction.

In the embodiments where the first reagent is a metalorganic, the first liquid solution may also comprise a solvent that is used to dissolve or complex the first reagent. Preferred solvents include organic solvents, such as an alcohol, for example, isopropyl alcohol or ethanol, alcohol derivatives such as 2-methoxyethanol, slightly less polar organic solvents such as pyridine or tetrahydrofuran (THF), or nonpolar organic solvents such as hexane and toluene.

In one embodiment, the first liquid solution is contained within a first reaction chamber. The reaction chamber must be a device large enough to accommodate receiving the electrode and to contain the amount of liquid solution to be used in the self-limiting layer producing reaction. Such devices that may be used as the reaction chamber include, but are not limited to, tanks, baths, trays, beakers, or the like.

The electrode may be transferred to the first reaction chamber by a conveying apparatus. The conveying apparatus, as described in more detail below, may be adapted and positioned in such a way as to guide or direct the electrode into and out of the first chamber.

In certain embodiments, the electrode may be submerged, either fully or partially, into the first and second liquid solutions of the first and second reaction chambers, respectively. In other embodiments, the electrode may be sprayed with the first and second liquid solutions in first and second reaction chambers, respectively.

In another embodiment, the electrode may be conveyed underneath a slot die coater, from which the first liquid solution is continuously dispensed to generate a two-dimensional liquid film. The speed at which the electrode is conveyed and the flow rate of fluid through the die determines the thickness of the liquid film. The solvent may then simply evaporate to create a solid film of the dissolved components, or the liquid film may possess reactants that react to precipitate a thin film on the surface of the electrode. The resulting solid film may be as thin as one atomic monolayer or as thick as 100 microns. The reaction may occur while the solvent is still present or after the solvent has evaporated. If residual solvent remains until after the end of the coating process, it may be removed by various techniques, such as a doctor blade, air knife, metering knife or similar. The entire slot die coating process may then be repeated to generate new films of different chemical composition or to simply generate thicker coatings of the same chemical composition. In this case, the reaction chambers simply comprise the area where the slot-die coater is located, and do not necessarily resemble an enclosed space as is suggested by the term "chamber."

In another embodiment, the electrode may be conveyed through a tank containing a coating solution and a gravure roller. In this embodiment, the gravure roller continuously transfers fluid from the dip tank to the adjacent web due to preferential surface tension (wetting) of the web and the roller by the coating solution. As in slot-die coating, the result is initially a two-dimensional liquid film on the surface of the electrode. Particular solution, web and roller compositions, for example, can influence the surface tension of the fluid on both the web and the roller, thereby influencing the coating efficiency of the process. The solvent may then simply evaporate to create a solid film of the dissolved components, or the liquid film may possess reactants that react to precipitate a thin film on the surface of the electrode. The resulting solid film may be as thin as one atomic monolayer or as thick as 100 microns. The reaction may occur while the solvent is still present or after the solvent has evaporated. If residual solvent remains until after the end of the coating process, it may be removed by various techniques, such as a doctor blade, air knife, metering knife or similar. The entire gravure coating process may then be repeated to generate new films of different chemical composition or to simply generate thicker coatings of the same chemical composition.

Multiple sequential, repeated steps of the same process (i.e., slot-die or gravure coating) can be performed with the same or different solutions. Solutions may be separated (as in first solution, second solution, etc.) to avoid cross-contamination, for instance, or to prevent homogenous nucleation when a heterogeneous film-forming reaction is preferred.

The electrode is exposed to the first liquid solution for a sufficient time (a "residence time") so as to allow the first reagent(s) to adsorb onto the electrode surface and generate a continuous layer (i.e. self-limiting layer). Examples of process variables that may influence this step include solution and electrode temperature, residence time and reagent concentration.

An advantage of the present methods and systems is that the solvents used vary in specific heat capacity and can also be employed as both heat transfer and precursor transfer media— yielding faster, more efficient heating of electrodes. Precursors dissolved into solution are also much more stable with regards to air ambient exposure as compared to their pure analogs, yielding improved safety and easier handling.

Optionally, the electrode may undergo a first rinsing/purge step, 102, whereby excess first reagent from step 100 is removed with a solvent. Here, most or all of the non-adsorbed first reagent will be removed from the electrode surface before moving the electrode to the next process step. Key process variables include solvent temperature, electrode temperature, and residence time. 102 is shown in FIG. 1 as a single step, however, in certain embodiments, this step may be repeated or may have additional rinsing/purging steps to improve first reagent removal.

The rinsing step leaves exactly one saturated (i.e., purified) first layer on the electrode and a residual solution comprising the first solvent, unreacted first reagent(s) and other reaction byproducts in the reaction chamber.

As an additional optional step, to recover the solvent used in the rinsing step and any unreacted reagent, the residual solution may be passed to a filtration step, 103. The filtration step separates the solvent from the unreacted reagent (and any reaction byproduct). The filtration step also prevents cross-contamination between chambers and avoids slow contamination of rinse solutions with reagent over the course of operation. Continuous filtering of rinse baths can not only maintain purity of rinse solvent but can also act as a system for materials recovery, thereby boosting the materials utilization efficiency of the process. Any filtration techniques known in the art may be used. Preferred technologies include, but are not limited to, membrane separation, chemical precipitation, ion-exchange, electrochemical removal, physical adsorption, and flow filtration chromatography.

The separated solvent may be recycled back to the rinsing step, 102, for reuse. Likewise, the filtered unreacted first reagent(s) may also be recycled back to 100 for further use in the process (not shown).

A partially coated battery electrode, having a layer (i.e., a self-limiting layer) comprising an adsorbed first reagent may then be exposed, in 104, to a second liquid solution comprising a second reagent in a second reaction chamber.

In some embodiments, the second liquid solution may comprise an oxidizing agent, such as an oxide or chalcogenide source, examples of which include, but are not limited to, water, thioacetamide, and sodium sulfide. A solvent may also be present, which may comprise of polar or nonpolar organic solvents or may just be water. In other embodiments, the second liquid solution may also contain a nitrogen-containing reagent such as ammonia or hydrazine. In some embodiments, the second solution may also vary in pH.

The second reagent is of a different and distinct composition as compared to the first reagent. The second reagent is selected to be able to react with the adsorbed first reagent to produce a complete monolayer of thin film compound coated onto the electrode.

In some embodiments, the entire film may be formed by reagents exposed to the electrode from the first liquid solution alone. In this case, the second solution may be skipped entirely.

In some embodiments, the compound formed may comprise a metal oxide, such as $Al_2O_3$ and $TiO_2$.

In other embodiments, the compound formed may comprise Transition Metal Dichalcogenides (TMDs). Typical examples of this class of materials follow the general chemical formula $MX_2$, where M is a transition metal such as Mo, W, Ti, etc., and X is either S or Se.

In some embodiments, the compound is composed of any combination of the following polymers: polyethylene oxide (PEO), poly vinyl alcohol (PVA), poly methyl methacrylate (PMMA), poly dimethyl siloxane (PDMS), poly vinyl pyrollidone (PVP). Such polymers, when combined with lithium salts such as $LiClO_4$, $LiPF_6$ or $LiNO_3$, among others, can yield a solid polymer electrolyte thin film.

In some embodiments, the compound may comprise, for example, a sulfide or selenide of Mo, Ti, or W. These materials vary widely in their electronic properties, such as bandgap, and thus can be used to create tailored semiconductor heterojunctions that will, for example, block electron transfer necessary for degrading reactions in lithium-ion battery operation. Specifically, such mechanisms can be exploited to block degrading reactions on both anode and cathode surfaces.

In some embodiments, the compound formed may be selected from the group consisting of:

(a) binary oxides of type $A_xO_y$, where A is an alkali metal, alkali-earth metal, transition metal, semimetal or metalloid and x and y are stoichiometric coefficients;

(b) ternary oxides of type $A_xB_yO_z$, where A and B are any combination of alkali metal, alkali-earth metal, transition metal, semimetal or metalloid and x, y and z are stoichiometric coefficients;

(c) quaternary oxides of type $A_wB_xC_yO_z$, where A, B and C are any combination of alkali metal, alkali-earth metal, transition metal, semimetal or metalloid and w, x, y and z are stoichiometric coefficients;

(d) binary halides of type $A_xB_y$, where A is an alkali metal, alkali-earth metal, transition metal, semimetal or metalloid, B is a halogen and x and y are stoichiometric coefficients;

(e) ternary halides of type $A_xB_yC_z$, where A and B are any combination of alkali metal, alkali-earth metal, transition metal, semimetal or metalloid, C is a halogen and x, y and z are stoichiometric coefficients;

(f) quaternary halides of type $A_wB_xC_yD_z$, where A, B and C are any combination of alkali metal, alkali-earth metal, transition metal, semimetal or metalloid, D is a halogen and w, x, y and z are stoichiometric coefficients;

(g) binary nitrides of type $A_xN_y$, where A is an alkali metal, alkali-earth metal, transition metal, semimetal or metalloid and x and y are stoichiometric coefficients;

(h) ternary nitrides of type $A_xB_yN_z$, where A and B are any combination of alkali metal, alkali-earth metal, transition metal, semimetal or metalloid and x, y and z are stoichiometric coefficients;

(i) quaternary nitrides of type $A_wB_xC_yN_z$, where A, B and C are any combination of alkali metal, alkali-earth metal, transition metal, semimetal or metalloid and w, x, y and z are stoichiometric coefficients;

(j) binary chalcogenides of type $A_xB_y$, where A is an alkali metal, alkali-earth metal, transition metal, semimetal or metalloid, B is a chalcogen and x and y are stoichiometric coefficients;

(k) ternary chalcogenides of type $A_xB_yC_z$, where A and B are any combination of alkali metal, alkali-earth metal, transition metal, semimetal or metalloid, C is a chalcogen and x, y and z are stoichiometric coefficients;

(l) quaternary chalcogenides of type $A_wB_xC_yD_z$, where A, B and C are any combination of alkali metal, alkali-earth metal, transition metal, semimetal or metalloid, D is a chalcogen and w, x, y and z are stoichiometric coefficients;

(m) binary carbides of type $A_xC_y$, where A is an alkali metal, alkali-earth metal, transition metal, semimetal or metalloid and x and y are stoichiometric coefficients;

(n) binary oxyhalides of type $A_xB_yO_z$, where A is an alkali metal, alkali-earth metal, transition metal, semimetal or metalloid, B is a halogen and x, y and z are stoichiometric coefficients;

(o) binary arsenides of type $A_xAs_y$, where A is an alkali metal, alkali-earth metal, transition metal, semimetal or metalloid and x and y are stoichiometric coefficients;

(p) ternary arsenides of type $A_xB_yAs_z$, where A and B are any combination of alkali metal, alkali-earth metal, transition metal, semimetal or metalloid and x, y and z are stoichiometric coefficients;

(q) quaternary arsenides of type $A_wB_xC_yAs_z$, where A, B and C are any combination of alkali metal, alkali-earth metal, transition metal, semimetal or metalloid and w, x, y and z are stoichiometric coefficients;

(r) binary phosphates of type $A_x(PO_4)_y$, where A is an alkali metal, alkali-earth metal, transition metal, semimetal or metalloid and x and y are stoichiometric coefficients;

(s) ternary phosphates of type $A_xB_y(PO_4)_z$, where A and B are any combination of alkali metal, alkali-earth metal, transition metal, semimetal or metalloid and x, y and z are stoichiometric coefficients; and (t) quaternary phosphates of type $A_wB_xC_y(PO_4)_z$, where A, B and C are any combination of alkali metal, alkali-earth metal, transition metal, semimetal or metalloid and w, x, y and z are stoichiometric coefficients.

In the case that the reaction is between a non-ionic precursor such as a metalorganic with an oxidizer, as in the hydrolysis of trimethylaluminum, organic moieties are removed and replaced with metal-oxygen-metal bonds, until all bonds are fully saturated. In the case that the reaction is between two ionic solutions, as in the reaction between solutions of $Cd^{2+}$ and $S^{2-}$ ions, the high solubility product constant of the reaction promotes precipitation of an ionic compound, in this case CdS, with the electrode promoting heterogeneous film formation by minimizing surface energy.

Similar to 102, the electrode from 104 is then directed to a second rinsing/purge step, 106, to remove non-adsorbed/unreacted second reagent.

In certain embodiments, the thin film may have a thickness of about 0.5 nm to 100 µm. For example, the thin film may be a thickness within the range of 0.5 nm-10 nm, 10 nm-50 nm, 50 nm-100 nm, 100 nm-500 nm, 500 nm-1 μm, 1 μm-10 μm, 10 um-50 μm, or 50 μm-100 μm.

In some embodiments, 100 to 106 may be repeated any number of times until a desired thickness of thin film coating is formed onto the electrode. This scheme is indicated by 108, where the electrode coated with the thin film is directed back to step 100 for further processing (forming a loop). In some embodiments, the steps will be repeated but with different precursors, thereby yielding coatings comprising of stacks of thin films comprising various compounds.

Additionally, during 102 and 106, the rinse or purge solvent may be either continuously or periodically filtered so that unreacted reagent(s) can be separated and recovered from solvent. This filtering step is indicated in steps 103 and 105, respectively. Both precursor and solvent can then be potentially recycled back into the process. Here, the recycling of the solvent is shown by the return arrows. These filtration steps will save significant material costs over the lifetime of the apparatus. For every wash and rinse step, a filtration step may be incorporated into the design. The filtration technique is preferably tuned to the types of reagents used in steps 100 and 104. For instance, an aqueous ionic solution may require the types of filtration columns used in deionizers to be adequately filtered. However, an organometallic may be better removed by a tangential flow filtration system that excludes by molecular weight, for instance.

Figure 2:
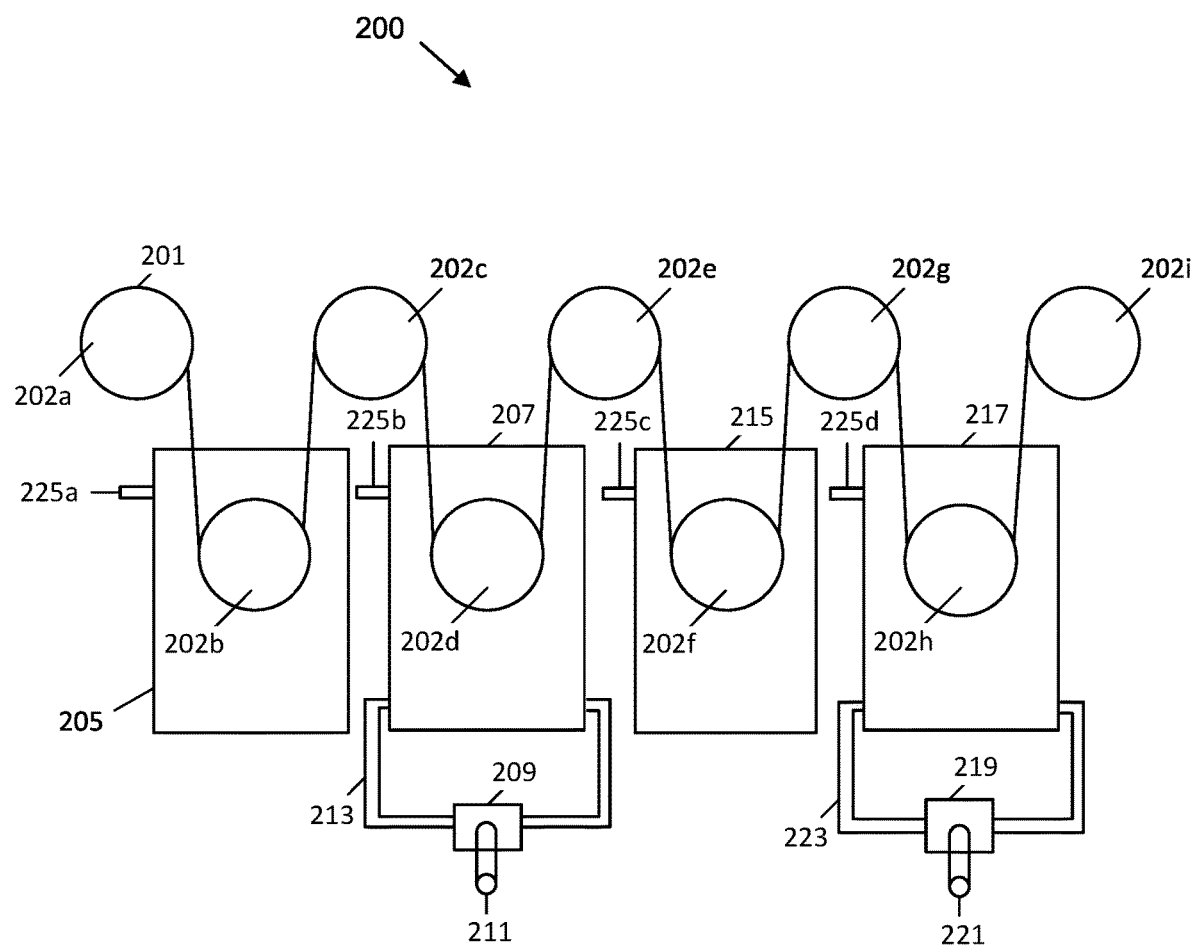
FIG. 2 is a schematic drawing of one embodiment of a system for coating a thin film onto the surface of a battery electrode in accordance with the disclosure.

A schematic drawing of an embodiment of a system for coating a thin film onto the surface of an electrode is shown in FIG. 2. In FIG. 2, the reaction chambers are shown as sequential tanks or baths containing reaction solutions; the electrode is conveyed into the reaction chambers with the assistance of a conveying apparatus. While the embodiment of FIG. 2 is related to a method for coating a thin film onto the surface of a battery electrode, this description is only representative of a component to be coated using the methods and systems provided herein and is not to be construed as being limited in any way.

The conveying apparatus of FIG. 2 is particularly suited and adapted in such a way as to guide or direct the battery electrode into and out of the first and second reaction chambers in a sequential manner.

The conveyance apparatus, which is preferably automated, comprises a series of rollers, such as tensioning rollers, positioned in such a manner as to guide or direct the electrode into and out of the first and second reaction chambers. In this way, the system can provide for a continuous liquid deposition process for coating a thin film onto the surface of an electrode. The series of rollers, 202a-i, are driven by a conveying motor (not shown). The rollers, 202a-i, are operated and oriented in such a way to enable an electrode, 201, to be conveyed through the system as discussed in greater detail below. The system, 200, also comprises a series of chambers, 205, 207, 215, and 217.

In certain embodiments, the first and second reaction chambers may include a sensor for determining or measuring the volume of first or second liquid solution that is in the respective reaction chamber or the concentration of precursor in each respective reaction chamber. Additionally, the first and second reaction chambers may also comprise a regulating valve that is electronically actuated by the sensor. When the sensor (such as a float switch) determines that the liquid solution is too low, the valve opens up, allowing more liquid solution from another source to flow into the reaction chamber. In some cases, a pump (such as a peristaltic pump) is used to drive the liquid solution into the reaction chamber. When the sensor determines that the liquid solution is at the desired level, the valve closes, preventing excess liquid solution from flowing into the reaction chamber. In some cases, if the sensor determines that the liquid solution is too high in the reaction chamber, the valve opens up, allowing the excess liquid to flow out of the reaction chamber. In the case that the sensor detects precursor concentration, a valve may expose the tank to a stock solution of high precursor concentration in the circumstance that the tank precursor solution is detected to be low, and vice-versa. An example of such a sensor is an ion-selective electrode.

In further embodiments, the system comprises a first rinsing chamber located between the first and second reaction chambers. The first rinsing chamber contains the first rinsing solution comprising the first solvent for rinsing the electrode conveyed to the first rinsing chamber by the conveyance apparatus to produce a saturated first layer on the electrode and a first residual solution comprising the first solvent and unreacted first reagent.

Likewise, the system may also comprise a second rinsing chamber located after the second reaction chamber. The second rinsing chamber contains a second rinsing solution comprising a second solvent for rinsing the electrode conveyed to the second rinsing chamber by the conveyance apparatus to produce a thin film coated onto the electrode.

Chamber 205 is a first reaction chamber that contains a first liquid solution comprising a first reagent and a solvent.

Chamber 207 is a first rinsing chamber located after the first reaction chamber, 205, contains a first rinsing solution comprising a first solvent. A first filtration apparatus, 209, is connected to the first rinsing chamber, 207. First filtration apparatus 209 has a residue tube, 213, that is connected to the first rinsing chamber, 207, and a permeate collection tube, 211.

Another chamber, 215, is a second reaction chamber located after the first rinsing chamber, 207, and contains a second liquid solution comprising a second reagent and a solvent.

Chamber 217 is a second rinsing chamber located after the second rinsing chamber, 215. Second rinsing chamber 217 contains a second rinsing solution comprising a solvent. A second filtration apparatus, 219, is connected to the second rinsing chamber, 217. Second filtration apparatus 219 has a residue tube, 223, that is connected to the second rinsing chamber, 217, and a permeate collection tube, 221.

System 200 further comprises valves 225a-d located on each of the chambers, 205, 207, 215, and 217, respectively. The valves, 225a-d, are connected to a replenishing source (not shown), which provide, when needed, additional first liquid solution, second liquid solution, first reagent, second reagent, or solvent, as in the case for first and second chambers 215 and 215, respectively, or more first rinsing solution or second rinsing solution, as in the case of first and second rinsing chambers, 207 and 217, respectively. Valves 225a-d may be electrically-actuated and opened by the triggering of a sensor (not shown), which is adapted to monitor or measure the volume or concentration of liquid solution in a chamber. The sensors may be dipped into the liquid solution of each chamber.

In operation, a first portion of an electrode, 203, is first placed on a first roller, 202a, which is part of conveying apparatus 201. Typically, the first portion is attached, such as by glue or tape, to a leader material that is strung through the rest of rollers 202b-i. In this way, the leader material can guide the electrode through the conveying apparatus, 201, during the process. The leader material may then be removed from the electrode once the portion of the electrode that was placed on roller 202a is conveyed to roller 202i or when coating of the entire electrode is completed. An example of such a leader material may be from a previous roll of electrode. In advance of the coating of a specific electrode, the previous roll of electrode e may have had a long trailing length with no active material (just foil). Once the previous roll has been processed, this remnant is left strung on the conveying apparatus, and the active material can be slit and removed. The remnant will then act as a leader to guide the next roll of electrode through the conveying apparatus.

Accordingly, the first portion of the electrode, 203, is conveyed into first reaction chamber 205 by movement of second roller 202b, which is also located within first reaction chamber 205. First portion of electrode 203 is exposed within first reaction chamber 205 to a first liquid solution to produce a self-limiting layer comprising an adsorbed first reagent on the surface of the first portion of the electrode. The first portion of electrode, 203, is left in first reaction chamber 205 for a certain residence time in order for the reaction to take place. Once the reaction is substantially completed, the first portion of electrode 203 is withdrawn from first reaction chamber 205 by moving upward to third roller 202c.

While this is occurring, a second portion of electrode 203 is conveyed into first reaction chamber 205. Conveying apparatus operates in a continuous manner until the desired amount of electrode is coated with thin film.

Returning back to the first portion of electrode 203, the first portion is then conveyed to a first rinsing chamber, 207 by movement of fourth roller 202d, which is also located within first rinsing chamber 207. The first rinsing chamber, 207, contains a first rinsing solution comprising a first solvent for rinsing the electrode 203 to produce a saturated first layer on the electrode and a first residual solution comprising the first solvent and unreacted first reagent.

The system may also comprise a filtration apparatus for separating unreacted reagent from the solvent in the first and second rinsing solutions. The filtration apparatus may be any device that can perform such a separation. Preferably, the filtration apparatus is selected from one of the following: a membrane, a filtration column, or a chromatographic column, a chemical or electrochemical separation tank, or an adsorption column.

When needed, the first rinsing solution is passed to first filtration apparatus 209 to separate the unreacted first reagent from the first solvent. The first filtration apparatus, 209, produces a permeate stream enriched in unreacted first reagent and depleted in first solvent and a residue stream enriched in first solvent and depleted in unreacted first reagent compared to the first rinsing solution. The permeate stream is collected in permeate collection tube 211, which may be recycled or sent back to the first reaction chamber, 205. The residue stream is recycled back to the first rinsing chamber, 207, via residue tubing 213. Filtration apparatus, 209, may operate periodically or continuously. From the first rinsing chamber 207, the first portion of electrode 203 is then withdrawn from first rinsing chamber 207 by moving upward to fifth roller 202e.

First portion of electrode 203 is then conveyed into second reaction chamber 215, by moving downward to sixth roller 202f, which is also located within second reaction chamber 215. Second reaction chamber 215 comprises a second liquid solution comprising at least a second reagent. Within second reaction chamber 215, the electrode, 203, is exposed to the second liquid solution, which reacts with the first adsorbed reagent to produce a monolayer of thin film coated onto the surface of the electrode. After the reaction is substantially completed, the first portion of electrode 203 is then withdrawn from second reaction chamber 215 by moving upward to seventh roller 202g.

Next, first portion of electrode 203 is conveyed to a second rinsing chamber, 217, by moving downward to eighth roller 202h, which is also located within second rinsing chamber 217. The second rinsing chamber, 217, contains a second rinsing solution comprising a second solvent for rinsing the electrode to produce a purified monolayer of thin film coated onto the surface of the electrode, 203, and a second residual solution comprising the second solvent and unreacted second reagent.

Similar to the first rinsing solution, the second rinsing solution may be sent to a second filtration apparatus, 219. Second filtration apparatus 219 produces a permeate stream enriched in unreacted second reagent and depleted in second solvent and a residue stream enriched in second solvent and depleted in unreacted second reagent compared to the second rinsing solution. The permeate stream is collected in permeate collection tube 221, which may be recycled or sent back to the second reaction chamber, 215. The residue stream is recycled back to the second rinsing chamber, 217, via residue tubing 223. Filtration apparatus, 219, may operate periodically or continuously.

Finally, first portion of electrode 203 is withdrawn from second rinsing chamber 217 being conveyed up to ninth roller 202i. From here, the first portion may be collected or rolled up until the rest of the desired portions of the electrode are coated with a thin film.

A similar embodiment of the present disclosure to that described in FIG. 2 can involve replacement of bath-deposition reaction chambers 205 and 215 with slot-die or gravure coating reaction chambers (not shown). In such an embodiment, rinse chambers 207 and 217 may or may not be present, depending on the need for a rinse step. In such an embodiment or even in the embodiment described in FIG. 2, an excess solution removal technique such as an air knife, doctor blade, metering knife or similar can be employed in lieu of a rinse step. In another similar embodiment, 215 may be entirely absent, as the entire deposition reaction may be performed in 205. As such, the apparatus of the present disclosure, both in terms of deposition equipment and conveying equipment, can be considered to be modular and assembled in any specific manner so as to facilitate a specific solution-deposition process.

Methods of the present disclosure can be implemented using, or with the aid of, computer systems. The computer system can be involved in many different aspects of the operation the present methods, including but not limited to, the regulation of various aspects of the conveyance apparatus, such as by directing movement of the conveyance apparatus by moving the component to be coated into and out of the reaction chambers; by controlling the timing of the opening and closing of valves; detecting the volume of liquid via sensor readings, directing the flow of liquids, such as reagents and buffers, into the reaction chambers; and regulating pumps. In some aspects, the computer system is implemented to automate the methods and systems disclosed herein.

The methods and systems provided above are now further described by the following examples, which are intended to be illustrative, but are not intended to limit the scope or underlying principles in any way.

EXAMPLES

Example 1: Deposition of $TiO_2$

Titanium isopropoxide is first dissolved in an appropriate anhydrous solvent, such as dry isopropyl alcohol, is adsorbed onto electrode surface. The component to be coated (such as an electrode) is then cleansed of excess, non-adsorbed titanium isopropoxide using a rinse solvent. Next, the electrode is introduced to a solution of an oxidizer, such as water, dissolved in an appropriate solvent, such as isopropyl alcohol. Hydrolysis results in loss of alkoxide ligand to 2-propanol, leaving an adsorbed moiety with added hydroxyl. In a fourth step, excess solution of water and solvent is removed by a rinse solvent. A single monolayer of titanium oxide is produced. The process may be repeated to yield increasing thickness.

Example 2: Deposition of CdS

Cadmium sulfate ($CdSO_4$) is first dissolved in an aqueous solution, yielding $Cd^{2+}$ ions adsorbed onto a surface of an electrode. The electrode is cleansed of excess, non-adsorbed $Cd^{2+}$. The electrode is then introduced to an aqueous solution containing an anionic sulfur precursor, such as thiourea or $Na_2S$. The pH of the precursor solutions may be varied to control rate of reaction. The high solubility product constant of CdS in this reaction results in the precipitation of a single monolayer of CdS on the electrode surface, where surface energy minimization promotes nucleation.

Example 3: Deposition of TiN

An electrode (or other component to be coated) is submerged or exposed to a solution of titanium ethoxide dissolved anhydrous ethanol. The electrode is cleansed of excess precursor. The electrode is exposed to a solution containing a nitrogen precursor, such as ammonia in pyridine or hydrazine in THF. Reaction of precursor with adsorbed titanium ethoxide results in a single monolayer of TiN.

Example 4: Coating Thin Films on Graphite Anodes

Figure 3A:
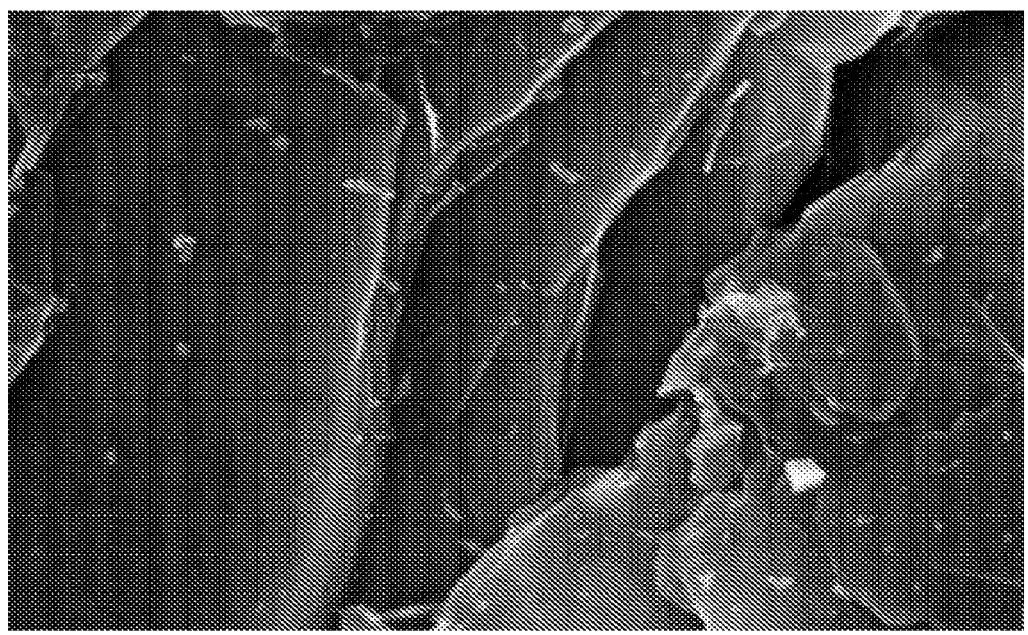
FIGS. 3A-3B are images magnified to 60 kX of a graphite electrode surface showing the difference in surface morphology between pristine, uncoated graphite (FIG. 3A) and graphite coated with a method in accordance with the disclosure (FIG. 3B).
Figure 3B:
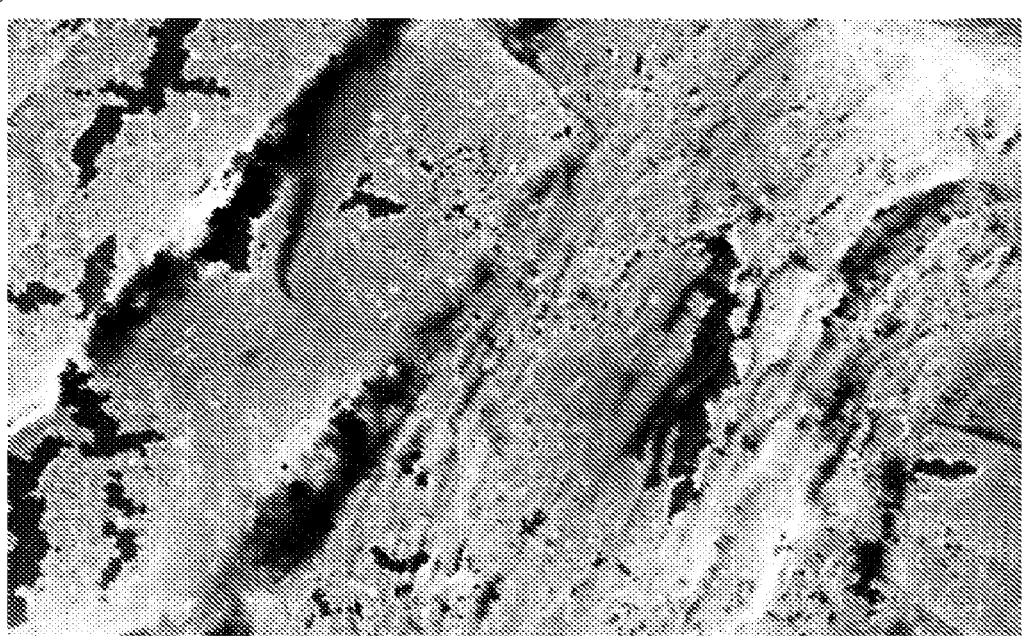

Coating processes were performed on graphite anodes. Scanning electron microscopy with energy dispersive X-ray spectroscopy (SEM-EDX) was employed to prove the presence of coating. SEM images showed a distinct change in the morphology of the surface of graphite anodes from before to after coating (FIGS. 3A-3B). EDX measurement of the local Al and O signals then confirmed that the coating material was in fact, $Al_2O_3$. The measurement of −0.9 atomic % Al via EDX is in the range of EDX signals of Al observed in ~1 nm ALD-coated graphite anodes demonstrated in literature. As such, the solution coated $Al_2O_3$ can be concluded to be within the range of coating thicknesses deposited via ALD in literature.

Example 5: Generating Graphite-Li Half-Cells

Figure 4:
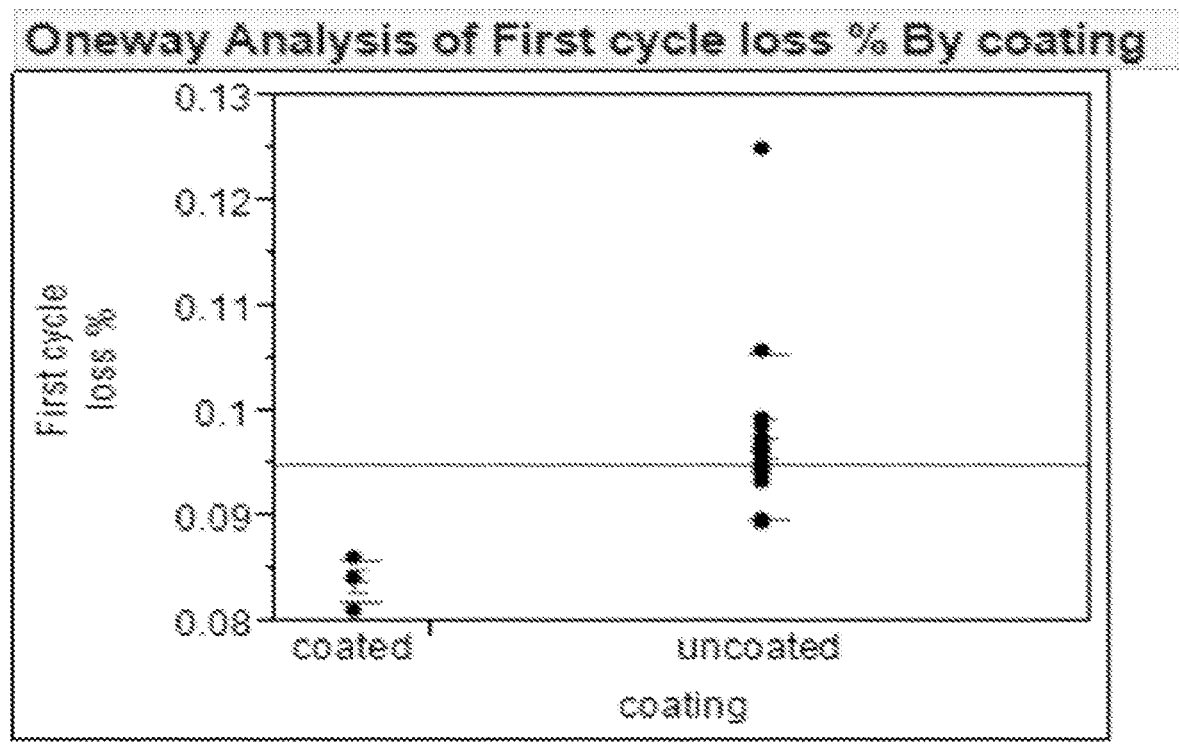
FIG. 4 is a scatter plot showing one-way first cycle loss of coated versus uncoated electrodes.
Figure 5:
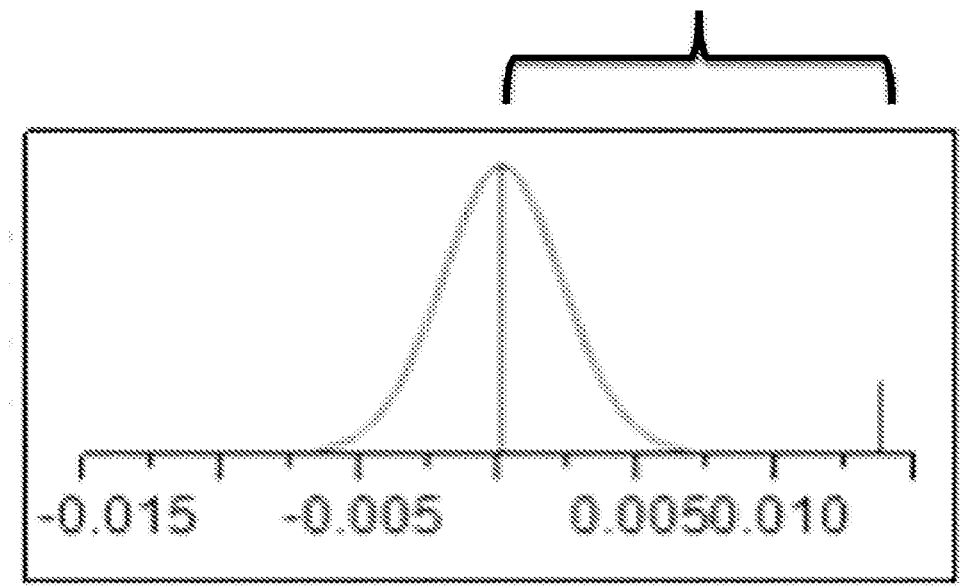
FIG. 5 is a t-test graph showing significant difference to 95% confidence in first cycle capacity loss between coated and uncoated anodes due to presence of the coating.

Coated graphite anodes were paired with Li foils to generate graphite-Li half-cells. Half-cells are ideal for generating precise data regarding the irreversible capacity loss to form SEI on graphite. Rapid cycles of learning were also achievable given that only one charge-discharge cycle was necessary to measure first cycle capacity loss. As can be seen from FIGS. 4-5 and Table 1, a statistically significant (to 95% confidence) difference of 1.37% in mean first cycle loss was achieved when comparing $Al_2O_3$-coated anodes to control.

TABLE 1

| Means and Std Deviations | | | | | | |
|---|---|---|---|---|---|---|
| Level | Number | Mean | Std Dev | Std Err Mean | Lower 95% | Upper 95% |
| Coated | 4 | 0.084 | 0.002 | 0.001 | 0.081 | 0.087 |
| uncoated | 17 | 0.098 | 0.008 | 0.002 | 0.093 | 0.102 |

| t-Test uncoated-coated (assuming unequal variances) | | | |
|---|---|---|---|
| Difference | 0.014 | t ratio | 6.282 |
| Std Err Diff | 0.002 | DF | 18.515 |
| Upper CL Dif | 0.018 | Prob >\|t\| | <0.0001 |
| Lower CL Dif | 0.01 | Prob >t | <0.0001 |
| Confidence | 0.95 | Prob <t | 1 |

Figure 6:
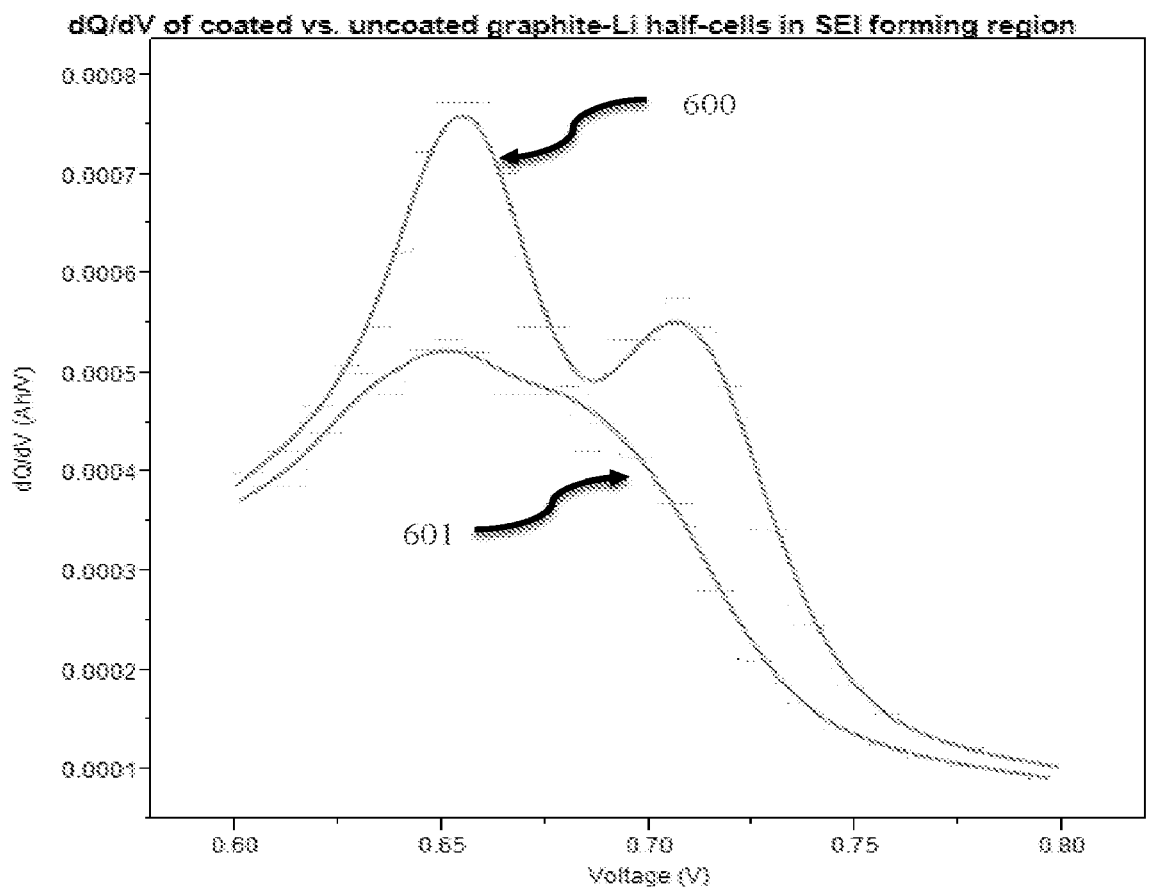
FIG. 6 is a graph showing the change in differential charge/differential voltage (dQ/dV) over voltage for an uncoated graphite anode (600) versus a coated graphite anode (601).

By plotting the differential charge/differential voltage (dQ/dV) vs half-cell voltage, it is possible to identify exactly the amount of charge transferred during the typical SEI formation voltages near 0.6-0.8V. As can be seen from FIG. 6, the differential charge from SEI generation is lower for coated half-cells (601) as opposed to uncoated (600), which is a clear indication that the SEI generation was suppressed by the coating.

It should be understood from the foregoing that, while particular implementations have been illustrated and described, various modifications can be made thereto and are contemplated herein. It is also not intended that the present disclosure be limited by the specific examples provided within the specification. While certain embodiments have been described with reference to the aforementioned specification, the descriptions and illustrations of the preferable embodiments herein are not meant to be construed in a limiting sense. Furthermore, it shall be understood that all aspects of the present disclosure are not limited to the specific depictions, configurations or relative proportions set forth herein which depend upon a variety of conditions and variables. Various modifications in form and detail of the embodiments will be apparent to a person skilled in the art. It is therefore contemplated that the present disclosure shall also cover any such modifications, variations and equivalents.

What is claimed is:
1. A battery cell, comprising:
an anode;
a cathode;
an electrolyte disposed between the anode and the cathode;
a polymer separator disposed between the anode and the cathode; and
a casing containing the anode, the cathode, the electrolyte, and the polymer separator, wherein the casing provides electrical contact to the anode and the cathode,
wherein at least one of the anode or cathode comprises a stacked plurality of artificial solid-electrolyte interphase (SEI) monolayers;
wherein the plurality of artificial SEI monolayers are substantially devoid of particle-to-particle internal resistance between electrode constituent particles; and
wherein the plurality of artificial SEI monolayers are individually comprised of one or more polymeric materials.
2. The battery cell of claim 1, wherein the anode possesses the plurality of artificial SEI monolayers.
3. The battery cell of claim 1, wherein the cathode possesses the plurality of artificial SEI monolayers.

4. The battery cell of claim 1, wherein both the anode and the cathode possess the plurality of artificial SEI monolayers.

5. The battery cell of claim 1, wherein the plurality of artificial SEI monolayers are disposed on at least one of the anode or the cathode to form a thin film coating having an overall thickness between 0.5 nanometers (nm) and 100 micrometers (μm).

6. The battery cell of claim 1, wherein at least one of the anode or cathode has a thickness of 100 nm to 1,000 μm.

7. The battery cell of claim 1, wherein at least one of the anode or cathode has pores ranging in size of 0.1 nm to 100 μm.

8. The battery cell of claim 1, wherein the anode is composed of graphite, Si, Sn, a Si-graphite composite, a Sn-graphite composite, or lithium metal.

9. The battery cell of claim 1, wherein the cathode is composed of $LiNi_xMn_yCo_zO_2$, $LiNi_xCo_yAl_zO_2$, $LiMn_xNi_yO_z$, $LiMnO_2$, $LiFePO_4$, $LiMnPO_4$, $LiNiPO_4$, $LiCoPO_4$, $LiV_2O_5$, sulfur or $LiCoO_2$ where x, y and z are stoichiometric coefficients.

10. The battery cell of claim 1, wherein the anode or cathode further comprises a substrate.

11. The battery cell of claim 10, wherein the substrate is in the form of a foil, sheet, or film.

12. The battery cell of claim 1, wherein the plurality of artificial SEI monolayers are comprised of one or more organic materials.

13. The battery cell of claim 12, wherein the one or more organic materials include a polymer comprising a polyamide, a polyethylene oxide, a polydimethyl siloxane, or a polyvinyl pyrrolidone.

14. The battery cell of claim 1, wherein the battery cell undergoes self-heating at a temperature greater than that in a battery cell not possessing the plurality of artificial SEI monolayers on at least one of an anode or a cathode.

15. The battery cell of claim 1, wherein the battery cell evolves $CO_2$, $O_2$, $H_2$ or any other gas at a temperature greater than that observed in a corresponding battery cell not possessing the plurality of artificial SEI monolayers on either anode or cathode.

16. The battery cell of claim 1, wherein the electrolyte comprises a salt and a solvent.

17. The battery cell of claim 16, wherein the salt is $LiPF_6$, $LiClO_4$, LiTFSI or $LiNO_3$.

18. The battery cell of claim 16, wherein the solvent comprises one or more of the following:
ethylene carbonate, ethyl methyl carbonate, dimethyl carbonate, fluorinated ethylene carbonate, propylene carbonate.

19. A battery cell, comprising:
an anode;
a cathode;
an electrolyte disposed between the anode and the cathode;
a polymer separator disposed between the anode and the cathode; and
a casing containing the anode, the cathode, the electrolyte, and the polymer separator,
wherein the casing provides electrical contact to the anode and the cathode;

wherein:
at least one of the anode or cathode comprises a plurality of stacked artificial solid-electrolyte interphase (SEI) monolayers coated onto electrode constituent particles of the anode or cathode,
each artificial SEI layer of the plurality of artificial SEI monolayers is produced by a roll-to-roll liquid-phase deposition method; and
the plurality of artificial SEI monolayers are substantially devoid of particle-to-particle internal resistance between the electrode constituent particles.

20. The battery cell of claim 19, wherein the liquid-phase deposition method comprises:
(a) providing at least one of a battery anode or cathode onto a conveyance apparatus;
(b) transferring, by the conveyance apparatus, the battery anode or cathode to a first reaction chamber containing a first liquid solution comprising at least a first reagent;
(c) exposing, by the conveyance apparatus, the anode and/or cathode to the first liquid solution in the first reaction chamber to yield a partially coated layer of the artificial SEI with the at least first reagent chemically bonded onto a surface of the battery anode or cathode;
(d) rinsing, in the first reaction chamber, the partially coated layer with a first rinsing solution comprising a first solvent to remove unreacted first reagent;
(e) transferring, by the conveyance apparatus, the battery anode or cathode from (d) to a second reaction chamber containing a second liquid solution comprising at least a second reagent;
(f) exposing, by the conveyance apparatus, the battery anode and/or cathode to the second liquid solution in the second reaction chamber, wherein the at least second reagent reacts with the at least first reagent chemically bonded onto the surface of the battery anode and/or cathode to produce the artificial SEI comprising a monolayer on the surface of the battery anode or cathode, the monolayer comprising a compound generated from the reaction of the at least second reagent and the first reagent; and
(g) rinsing, in the second reaction chamber, the coating with a second rinsing solution comprising a second solvent to remove unreacted second reagent.

21. The battery cell of claim 1, wherein the battery cell is rechargeable.

22. The battery cell of claim 1, wherein the plurality of artificial SEI monolayers are capable of withstanding exposures to temperatures up to 300° C. without decomposing exothermically.

23. The battery cell of claim 22, wherein the plurality of artificial SEI monolayers are capable of withstanding exposures to temperatures up to 200° C. without decomposing exothermically.

24. The battery cell of claim 22, wherein the plurality of artificial SEI monolayer are capable of withstanding exposures to temperatures up to 100° C. without decomposing exothermically.

25. The battery cell of claim 1, wherein the plurality of artificial SEI monolayers do not react exothermically with any physically adjacent electrolyte, polymer separator, or other battery cell component.

* * * * *